US008074670B2

(12) United States Patent  (10) Patent No.: US 8,074,670 B2
Peters et al.  (45) Date of Patent: Dec. 13, 2011

(54) MAINTAINING DYNAMIC WATER STORAGE IN UNDERGROUND POROSITY RESERVOIRS

(75) Inventors: Stanley R. Peters, Castle Rock, CO (US); Donald O. Summers, Morrison, CO (US)

(73) Assignee: PS Systems, Inc., Lakewood, CO (US)

( * ) Notice: Subject to any disclaimer, the term of this patent is extended or adjusted under 35 U.S.C. 154(b) by 862 days.

(21) Appl. No.: 11/862,097

(22) Filed: Sep. 26, 2007

(65) Prior Publication Data

US 2008/0072968 A1  Mar. 27, 2008

Related U.S. Application Data

(60) Provisional application No. 60/847,143, filed on Sep. 26, 2006.

(51) Int. Cl.
*B65G 5/00* (2006.01)
(52) U.S. Cl. ............... 137/1; 137/236.1; 405/55; 405/80
(58) Field of Classification Search ........... 137/1, 236.1; 405/53, 55, 80
See application file for complete search history.

(56) References Cited

U.S. PATENT DOCUMENTS

| | | |
|---|---|---|
| 1,159,055 A | 11/1915 | Lowe, Sr. |
| 1,173,208 A | 2/1916 | Murray |
| 1,815,722 A | 7/1931 | Mills |
| 2,791,886 A | 5/1957 | Veder |
| 3,152,640 A | 10/1964 | Marx |
| 3,354,656 A | 11/1967 | Fahnestock |
| 3,380,252 A | 4/1968 | Renshaw |
| 3,559,737 A | 2/1971 | Ralstin et al. |
| 3,645,101 A | 2/1972 | Sherard |
| 3,800,544 A | 4/1974 | Nakanishi |
| 3,967,451 A | 7/1976 | Garbe |
| 4,180,348 A | 12/1979 | Taylor |
| 4,222,685 A | 9/1980 | Jefferson |
| 4,276,164 A | 6/1981 | Martone et al. |
| 4,288,174 A | 9/1981 | Laws |
| 4,326,818 A | 4/1982 | Willis |
| 4,344,722 A | 8/1982 | Blais |
| 4,457,646 A | 7/1984 | Laesch |
| 4,501,788 A | 2/1985 | Clem |

(Continued)

OTHER PUBLICATIONS

Murray, Kent S. "Groundwater Hydrology- Darcy'Law (Physical Properties & Principles)" Geology 375. The University of Michigan, Dearborn, MI. pp. 1-5. Obtained Oct. 1, 2008 from http://www.umd.umich.edu/casl/natsci/geology/lectr2.rtf.

(Continued)

*Primary Examiner* — Kevin L Lee
(74) *Attorney, Agent, or Firm* — Merchant & Gould PC

(57) ABSTRACT

An underground porosity reservoir includes substantially impermeable barriers and an aquiclude surrounding a volume of alluvial materials for storing water within the pore spaces of the alluvial materials. Upstream and downstream ends of the reservoir define both a static storage portion (extending below an elevation of the downstream end of the reservoir) and an elevated wedge-shaped portion that extends above the static portion. Once the static portion of the reservoir is filled, additional amounts of water are dynamically stored within the wedge portion by removing water from the downstream end of the reservoir and adding water to the upstream end of the reservoir. Water may be recirculated within the wedge portion, or external water may be added to the upstream end of the reservoir at a first flow rate while water is removed from the downstream end of the reservoir at a similar flow rate.

25 Claims, 10 Drawing Sheets

U.S. PATENT DOCUMENTS

| | | | |
|---|---|---|---|
| 4,577,679 A | 3/1986 | Hibshman | |
| 4,623,283 A | 11/1986 | Chew | |
| 4,637,462 A | 1/1987 | Grable | |
| 4,651,824 A | 3/1987 | Gradle | |
| 4,691,778 A | 9/1987 | Pyne | |
| 4,696,607 A | 9/1987 | Ressi di Cervia | |
| 4,902,167 A | 2/1990 | Shelton | |
| 4,919,568 A | 4/1990 | Hurley | |
| 4,946,169 A | 8/1990 | Hofmann | |
| 4,986,696 A | 1/1991 | Pera | |
| 4,988,235 A | 1/1991 | Hurley | |
| 5,030,036 A | 7/1991 | Huff et al. | |
| 5,080,528 A | 1/1992 | Ressi di Cervio | |
| 5,178,491 A | 1/1993 | Graves et al. | |
| 5,228,802 A | 7/1993 | Kuwabara et al. | |
| 5,249,887 A | 10/1993 | Phillips | |
| 5,316,410 A | 5/1994 | Blume | |
| 5,342,144 A | 8/1994 | McCarthy | |
| 5,345,034 A | 9/1994 | Corey | |
| 5,347,849 A | 9/1994 | Reeme et al. | |
| 5,360,290 A | 11/1994 | Yamada et al. | |
| 5,450,899 A | 9/1995 | Belonenko et al. | |
| 5,458,436 A | 10/1995 | Plowman et al. | |
| 5,468,097 A | 11/1995 | Bernhardt | |
| 5,567,079 A * | 10/1996 | Felder | 405/80 |
| 5,672,028 A | 9/1997 | Mechta | |
| 5,758,991 A | 6/1998 | Shiosaka | |
| 5,827,010 A | 10/1998 | Hassett | |
| 5,885,026 A | 3/1999 | Hwang | |
| 5,965,031 A | 10/1999 | Kitz et al. | |
| 6,000,880 A | 12/1999 | Halus | |
| 6,041,738 A | 3/2000 | Hemauer et al. | |
| 6,095,718 A | 8/2000 | Bohnhoff | |
| 6,102,618 A | 8/2000 | Takada et al. | |
| 6,116,816 A | 9/2000 | Suthersan et al. | |
| 6,120,210 A | 9/2000 | Hsu | |
| 6,139,225 A | 10/2000 | Koike et al. | |
| 6,196,762 B1 * | 3/2001 | Stude | 405/80 |
| 6,280,118 B1 | 8/2001 | Suthersan et al. | |
| 6,298,671 B1 | 10/2001 | Kennelley et al. | |
| 6,375,907 B1 | 4/2002 | Gallup | |
| 6,467,994 B1 | 10/2002 | Ankeny et al. | |
| 6,840,710 B2 | 1/2005 | Peters et al. | |
| 7,192,218 B2 | 3/2007 | Peters et al. | |
| 2007/0154262 A1 | 7/2007 | Peters et al. | |
| 2008/0072968 A1 | 3/2008 | Peters et al. | |
| 2008/0073087 A1 | 3/2008 | Peters et al. | |
| 2008/0226395 A1 | 9/2008 | Peters et al. | |
| 2009/0173142 A1 | 7/2009 | Peters et al. | |

OTHER PUBLICATIONS

Thomas V. Cech, "Principle of Water Resources", pp. 101-102, (John Wiley & Sons, Inc., 2005).

*City of Aurora* v. *PS System Inc. and RAR Group, LLC*, Civil Action No. 07-CC-02371-WYD-BNB, Complaint for Declaratory Judgment of Non-Infringement, Invalidity, and Unenforceability (Jury Trial Demanded), Nov. 2007, pp. 1-10.

*City of Aurora* v. *PS System Inc. and RAR Group, LLC*, Civil Action No. 07-CV-02371-WYD-BNB, Plaintiff's Responses to Defendants' First Set of Interrogatories, Feb. 2008, pp. 1-18.

*City of Aurora* v. *PS System Inc. and RAR Group, LLC*, Civil Action No. 07-CV-02371-WYD-BNB, Plaintiff's Expert Disclosures Pursuant to Fed. R. Civ. P. 26(a)(2), Jun. 2008, pp. 1-93.

Henk M. Haitjema, Analytic element modeling of groundwater flow, Chapter 3—Dupuit- Forchheimer Flow, 1995, p. 138.

SPR stores water for tomorrow; Internet print-out; 2 pages, 1994.

SPR Underground water banking: how water is captured and stored; Internet print-out; 2 pages, 1996.

Calculating total porosity, aeration porosity, and water retention of growing media or soil; Internet print-out, 2 pages, 1987.

U.S. Appl. No. 60/290,785, filed May 15, 2001.

U.S. Appl. No. 60/373,887, filed Apr. 19, 2002.

U.S. Appl. No. 60/547,496, filed Feb. 24, 2004.

Alther, George R. et al. No Feet of Clay. Civil Engineering, Aug. 1990, pp. 60-61 and 1323.

Amended Findings of Fact, Conclusions of Law and Decree of the Water Court. Concerning the Application for Water Rights of: Central Colorado Water Conservancy District in Weld County. Water Court, Water Division No. 1, State of Colorado, Case No. 88-CW-127, Dec. 18, 1992, pp. 1-8.

Amended Findings of Fact, Conclusions of Law and Decree of the Water Court. Concerning the Application for Water Rights of: Central Colorado Water Conservancy District in Weld County. Water Court, Water Division No. 1, State of Colorado, Case No. 88-CW-127, Dec. 18, 1992, pp. 1-9.

Anagnostou, G. and Kovari, K. The Face Stability of Slurry-Shield-Driven Tunnels. Tunneling and Underground Space Technology, vol. 9, No. 2, 1994, pp. 465-174.

Application for Water Rights of Chris Dinsdale, Findings of Fact, Conclusions of Law and Decree of Court. Case Nos. 2001CW61 and 2003CW194, Oct. 5, 2006, pp. 1-33.

Application for Water Rights of Dinsdale Brother, Inc. Application for Water Rights and Approval of Plan for Augmentation. Case No. m 03-CW-194, Apr. 2003, pp. 1-9.

Application for Water Rights of Lower Logan Well Users, Inc. Order to Correct Findings of Fact, Conclusions of Law and Decree of the Water Court Pursuant to § 37-92-304(10), C.R.S. Case No. 03CW195, Feb. 21, 2006, pp. 1-146.

Application of Water Rights of Lower Logan Well Users, Inc. Findings of Fact, Conclusion of Law and Decree of Water Court. Case No. 03CW2008, Jan. 19, 2005, pp. 1-71.

Application for Water Rights of Sedgwick County Well Users, Inc. Findings of Fact, Conclusions of Law and Decree of Water Court. Case No. 03CW209, Nov. 8, 2005, pp. 1-74.

Application for Water Rights of Thomas Patrick Svoboda. Revised Findings and Ruling of the Water Referee and Decree of the Water Court. Case No, 96CW120, Jul. 16, 2003, pp. 1-21.

Application for Water Rights of William E. Condon. Findings of Fact, Conclusions of Law, Judgment and Decree. Case No. W-8460-76, Aug. 28, 1981, pp. 1-29.

Application for Water Rights of The Lower South Platte Water Conservancy District Water Activity Enterprise. Case No. 02CW320, Apr. 11, 2007, pp. 1-63.

Arvada Reservoir As-Constructed Survey. Applegate Group, Dec. 30, 2002, pp. 1.

Cement-Bentonite Slurry Trench Cutoff Walls. Concrete Information, Portland Cement Association, 1984, 12 pages.

Chapter VI Artificial Groundwater Recharge and Management [Preliminary Draft]. SEWRPC Technical Report No. 43, Dec. 21, 2006, pp. 1-44.

Chow, Ven Te. Handbook of Applied Hydrology—A Compendium of Water-Resources Technology. McGraw-Hill Book Company, 1964, 6 pages.

City Of Aurora. Addendum No. 01—Bid Package J1 North Campus Facilities Construction Project NR: 1121 J1. Dated Dec. 11, 2007, 146 pages.

City of Aurora. Addendum No. 02—Bid Package J1 North Campus Facilities Construction. Project NR: 1121 J1. Dated Jan. 9, 2008, 258 pages.

City of Aurora. Addendum No. 02: Revision 1—Bid Package J1 North Campus Facilities Construction. Project NR: 1121 J1. Dated Jan. 10, 2008, 3 pages.

City of Aurora. Addendum No. 02: Revision 2—Bid Package J1 North Campus Facilities Construction, Project NR: 1121 J1. Dated Jan. 11, 2008, 4 pages.

Construction Plans for City of Arvada South Platte Reservoir Project. Section 17, TWP, 2S, Rng. 67W, Adams County, Colorado, Jun. 2003, pp. 1-11.

Daniel, David E. and Koerner, Robert M. Technical Guidance Document: Quality Assurance and Quality Control for Waste Containment Facilities, EPA/600/R-93/182, Sep. 1993, pp, 1-328.

Day, Steven R. The Compatibility of Slurry Cutoff Wall Materials With Contaminated Groundwater. 1994, ASTM International, pp. 284-299.

Day, Steven R., Ryan, Christopher R. and Fisk, Gary. Innovative Slurry Trench Methods for the Rehabilitation of Small Dams. Annual Meeting of the Association of State Dam Safety Officials, Sep. 9-13, 2001, pp. 1-12.

Deere, Don W. et al. Gravel Pit Reservoirs Colorado's Water Storage Solution. Geo-Volution 2006: The Evolution of Colorado's Geological and Geotechnical Engineering Practice (GPP 4), 2006, pp, 1-16.
EPA J.H. Baxter Superfund Site. EPA Announces Construction Activity for Groundwater and Soils Remedy. Region D, San Francisco, CA, Mar. 1999, pp. 1-5.
EPA Region 6. Petro-Chemical Systems, Inc. (Turtle Bayou), Texas. TXD980873350, Site ID 0602957, Apr. 28, 2005, pp. 1-7.
EPA Region 6. Superfund Site Status Summaries, Arkansas, Industrial Waste Control, Nov. 25, 1995, pp. 1-7.
EPA. Construction Quality Control and Post-Construction Performance Verification for the Gilson Road Hazardous Waste Site Cutoff Wall. EPA/600/2-87/065, Aug. 1987, pp. 1-257.
EPA. Engineering Bulletin Slimy Walls. EPA/540/S-92/008, Oct. 1992, pp. 1-8.
EPA. EPA Superfund Record of Decision: Allied Chemical & Ironton Coke. EPA/ROD/R05-88/078, Sep. 29, 1988, pp. 1-49.
EPA. EPA Superfund Record of Decision: Allied Chemical & Ironton Coke. EPA/ROD/R05-91/151, Dec. 28, 1990, pp. 1-27.
EPA. EPA Superfund Record of Decision: Arrowhead Refinery Co. EPA/ROD/R05-86/044, Sep. 30, 1986, pp. 1-24.
EPA. EPA Superfund Record of Decision: Bayou Sorrel. EPA/ROD/R06-87/503, Nov. 14, 1986, pp. 1-46.
EPA. EPA Superfund Record of Decision: Bio-Ecology Systems, Inc. EPA/ROD/R06-84/001, Jun. 6, 1984, pp. 1-35.
EPA. EPA Superfund Record of Decision: Brodhead Creek. EPA/ROD/R03-91/110, Mar. 29, 1991, pp, 1-23.
EPA. EPA Superfund Record of Decision: Chrisman Creek. EPA/ROD/R03-86/030, Sep. 30, 1986, pp. 1-27.
EPA. EPA Superfund Record of Decision: Cleve Reber, EPA/ROD/R06-87/020, Mar. 31, 1987, pp. 1-42.
EPA. EPA Superfund Record of Decision: Coast Wood Preserving. EPA/ROD/R09-89/038, Sep. 29, 1989, pp. 1-59.
EPA. EPA Superfund Record of Decision: Diamond Alkali Co. EPA/ROD/R02-87/053, Sep. 30, 1987, pp. 1-64.
EPA. EPA Superfund Record of Decision: Douglassville Disposal. EPA/ROD/R03-85/016, Sep. 27, 1985, pp. 1-18.
EPA. EPA Superfund Record of Decision: E.H. Schilling Landfill. EPA/ROD/R05-89/099, Sep. 29, 1989, pp. 1-29.
EPA. EPA Superfund Record of Decision: Fairchild Semiconductor Corp. (Mountain View Plant). EPA/ROD/R09-89/030, Jun. 9, 1989, pp. 1-75.
EPA. EPA Superfund Record of Decision: Fairchild Semiconductor Corp, (South San Jose Plant). EPA/ROD/R09-89/028, Mar. 20, 1989, pp. 1-62.
EPA. EPA Superfund Record of Decision: Forest Waste Products. EPA/ROD/R05-88/062, Mar. 31, 1988, pp. 1-89.
EPA. EPA Superfund Record of Decision: G&H Landfill. EPA/ROD/R05-91/152, Dec. 21, 1990, pp. 1-34.
EPA. EPA Superfund Record of Decision: GE Moreau. EPA/ROD/R02-87/039, Jul. 13, 1987, pp. 1-42.
EPA. EPA Superfund Record of Decision: Geneva Industries/Fuhrmann Energy. EPA/ROD/R06-86/012, Sep. 18, 1986, pp. 1-46.
EPA. EPA Superfund Record of Decision: Helen Kramer Landfill. EPA/ROD/R02-85/020, Sep. 27, 1985, pp. 1-36.
EPA. EPA Superfund of Decision: Highlands Acid Pit. EPA/ROD/R06-87/021, Jun. 26, 1987, pp. 1-19.
EPA. EPA Superfund Record of Decision: Hooker (102nd Street). EPA/ROD/R02-90/117, Sep. 26, 1990, pp. 1-32.
EPA. EPA Superfund Record of Decision: Hunts Disposal Landfill. EPA/ROD/R05-90/148, Sep. 29, 1990, pp. 1-45.
EPA. EPA Superfund Record of Decision: Industrial Waste Control. EPA/ROD/R06-88/036, Jun. 28, 1988, pp. 1-16.
EPA. EPA Superfund Record of Decision: Intel Corp. (Mountain View Plant). EPA/ROD/R09-89/031, Jun. 9, 1989, pp. 1-32.
EPA. EPA Superfund Record of Decision: Kin-Buc Landfill. EPA/ROD/R02-88/068, Sep. 30, 1988, pp. 1-39.
EPA. EPA Superfund Record of Decision: Kysor Industrial Corp. EPA/ROD/R05-89/113, Sep. 29, 1989, pp. 1-37.
EPA. EPA Superfund Record of Decision: LaSalle Electric Utilities. EPA/ROD/R05-88/061, Mar. 30, 1988, pp. 1-29.
EPA. EPA Superfund Record of Decision: Lauer I Sanitary Landfill. EPA/ROD/R05-96/295, Mar. 11, 1996, pp. 1-100.

EPA. EPA Superfund Record of Decision: Lemberger Landfill, Inc. EPA/ROD/R05-91/186, Sep. 23, 1991, pp. 1-28.
EPA. EPA Superfund Record of Decision: Lemberger Transport & Recycling. EPA/ROD/R05-91/187, Sep. 23, 1991, pp. 1-24.
EPA. EPA Superfund Record of Decision: Lipari Landfill. EPA/ROD/R02-82/006, Aug. 3, 1982, pp. 1-2.
EPA. EPA Superfund Record of Decision: Lipari Landfill. EPA/ROD/R02-85/023, Sep. 30, 1995, pp. 1-81.
EPA. EPA Superfund Record of Decision: Lipari Landfill. EPA/ROD/R02-88/074, Jul. 11, 1988, pp. 1-99.
EPA. EPA Superfund Record of Decision: Liquid Disposal. Inc, EPA/ROD/R05-87/051, Sep. 30, 1987, pp. 1-42.
EPA. EPA Superfund Record of Decision: Lone Pine Landfill. EPA/ROD/R02-84/007, Sep. 28, 1984, pp. 1-63.
EPA. EPA Superfund Record of Decision: Lone Pine Landfill. EPA/ROD/R02-90/106, Sep. 28, 1990, pp. 1-41.
EPA. EPA Superfund Record of Decision: Master Disposal Service Landfill. EPA/ROD/R05-90/146, Sep. 26, 1990, pp. 1-21.
EPA. EPA Superfund Record of Decision: Motor Wheel, Inc. EPA/ROD/R05-91/172, Sep. 30, 1991, pp. 1-22.
EPA. EPA Superfund Record of Decision; Ninth Avenue Dump. EPA/ROD/R05-88/071, Sep. 20, 1988, pp. 1-33.
EPA. EPA Superfund Record of Decision: Ninth Avenue Dump. EPA/ROD/R05-89/095, Jun. 30, 1989, pp. 1-47.
EPA. EPA Superfund Record of Decision: Old Springfield Landfill. EPA/ROD/R01-88/033, Sep. 22, 1988, pp. 1-34.
EPA. EPA Superfund Record of Decision: Onalaska Municipal Landfill. EPA/ROD/R05-90/125, Aug. 14, 1990, pp. 1-110.
EPA. EPA Superfund Record of Decision: Osborne Landfill. EPA/ROD/R03-90/099, Sep. 28, 1990, pp. 1-74.
EPA. EPA Superfund. Record of Decision: Outboard Marine Corp. EPA/ROD/R05-84/007, May 15, 1984, pp. 1-9.
EPA. EPA Superfund Record of Decision: Petro-Chemical Systems, Inc. (Turtle Bayou). EPA/ROD/R06-91/066, Sep. 6, 1991, pp. 1-50.
EPA. EPA Superfund Record of Decision: Pollution Abatement Services. EPA/ROD/R02-84/008, Jun. 6, 1984, pp. 1-18.
EPA. EPA Superfund Record of Decision: Pollution Abatement Services, EPA/ROD/R02-94/226, Dec. 29, 1993, pp. 1-95.
EPA. EPA Superfund Record of Decision: Raytheon Corp. EPA/ROD/R09-89/032, Jun. 9, 1989, pp, 1-32.
EPA. EPA Superfund Record of Decision: Rocky Mountain Arsenal (US Army). EPA/ROD/R08-90/036, Feb. 26, 1990, pp. 1-18.
EPA. EPA Superfund Record of Decision: Rocky Mountain Arsenal (US Army). EPA/ROD/R08-90/040, Mar. 20, 1990, pp. 1-19.
EPA. EPA Superfund Record of Decision: Rocky Mountain Arsenal (US Army). EPA/ROD/R08-90/042, Feb, 26, 1990, pp, 1-20.
EPA. EPA Superfund Record of Decision: Schmalz Dump. EPA/ROD/R05-87/054 Sep, 30, 1987, pp. 1-21.
EPA. EPA Superfund Record of Decision: Scientific Chemical Processing, EPA/ROD/R02-90/109, Sep. 14, 1990, pp. 1-33.
EPA. EPA Superfund Record of Decision: Sheridan Disposal Services. EPA/ROD/R06-89/051, Sep, 27, 1989, pp. 1-15.
EPA. EPA Superfund Record of Decision: Sol Lynn/Industrial Transformers. EPA/ROD/R06-88/029, Mar. 25, 1988, pp. 1-46.
EPA. EPA Superfund Record of Decision: South Macomb Disposal Authority (Landfills #9 and #9A). EPA/ROD/R05-91/166, Aug. 31, 1991, pp. 1-26.
EPA. EPA Superfund Record of Decision: South Valley. EPA/ROD/R06-88/037, Jun. 28, 1988, pp. 1-15.
EPA. EPA Superfund Record of Decision: Southern Maryland Wood Treating. EPA/ROD/R03-88/051, Jun. 29, 1988, pp. 1-46.
EPA. EPA Superfund Record of Decision: Summit National. EPA/ROD/R05-88/083, Jun. 30, 1988, pp. 1-47.
EPA. EPA Superfund Record of Decision: Summit National, EPA/ROD/R05-91/154, Nov. 2, 1990, pp. 1-9.
EPA. EPA Superfund Record of Decision: Sydney Mine Sludge Ponds, EPA/ROD/R04-89/054, Sep. 29, 1989, pp. 1-25.
EPA. EPA Superfund Record of Decision: Sylvester. EPA/ROD/R01-82/005, Jul. 29, 1982, pp. 1-15.
EPA. EPA Superfund Record of Decision: Sylvester. EPA/ROD/R01-83/007, Sep. 22, 1983, pp. 1-17.
EPA. EPA Superfund Record of Decision: Tybouts Corner Landfill. EPA/ROD/R03-86/019, Mar. 6, 1986, pp. 1-31.

EPA. EPA Superfund Record of Decision: Waste Disposal Engineering, EPA/ROD/R05-88/063, Dec. 31, 1987, pp. 1-45.
EPA. EPA Superfund Record of Decision: Whitehouse Oil Pits, EPA/ROD/R04-85/003, May 30, 1985, pp. 1-13.
EPA. Evaluation of Subsurface Engineered Barriers at Waste Sites. EPA 542-R-98-005, Aug. 1998, pp. 1-148.
EPA. Evaluation of Subsurface Engineered Barriers at Waste Sites. vol. II, Appendix B. EPA 542-R-98-005a, Jul. 1998, pp. 1-244.
EPA. National Water Quality Inventory, 1998 Report to Congress: Ground Water and Drinking Water Chapters, EPA-816-R-00-013, Aug. 2000, pp. 1-11.
EPA. Slurry Trench Construction for Pollution Migration Control, EPA-540/2-84-001, Feb. 1984, pp. 1-268.
EPA. Technical Guidance. Document: construction Quality Management for Remedial Action and Remedial Design Waste Containment Systems. EPA/540/R-92/073, Oct. 1992, pp. 1-108.
EPA. The Class V Underground Injection Control Study: vol. 21, Aquifer Recharge and Aquifer Storage and Recovery Wells. EPA/816-R-99-014u, Sep. 1999, pp. 1-73.
Evans, Jeffrey et al. Slurry Walls for Groundwater Control: A Comparison of UK and US Practice. ASCE/PENNDOT Central PA Geotechnical Conference, May 13-15, 2002, pp. 1-9.
Executive Summary: the Statewide Water Supply Initiative, A Collaborative Assessment of Future Water Needs and Solutions. SWSI, Nov. 10, 2004, 51 pages.
Findings of Fact, Conclusions of Law and Decree of the Water Court. Concerning the Application for Water Rights of: Hall-Irwin Construction Company In Weld County. Water Court, Water Division No. I, State of Colorado, Case No. 88-CW-127, May 25, 1990, pp. 1-7.
Findings of Fact, Conclusions of Law and Decree of the Water Court. Concerning the Application for Water Rights of: Hall-Irwin Construction Company In Weld County. Water Court, Water Division No. I, State of Colorado, Case No. 88-CW-127, May 25, 1990, pp. 1-9.
Fredericks, J. and Labadie, J. Decision Support System for Conjunctive Stream-Aquifer Management. Colorado Water Resources Research Institute, Aug. 1995, 202 pages.
Freeman, H. and Harris, E. Hazardous Waste Remediation. Innovative Treatment Technologies. Technomic Publishing Company, Oct. 18, 1995, p. 12.
GEI Consultants, Inc. Alluvial Well Field Project Phase I Completion Memorandum. Geotechnical Environmental and Water Resources Engineering, Dec. 2006, pp. 1-66.
GEI Consultants, Inc. Well Construction Completion Report for Phase I, and II, of the Thornton Well Field Project. Geotechnical Environmental and Water Resources Engineering, Mar. 24, 2003, pp. 1-87.
General Guidelines for Substitute Water Supply Plans for Sand and Gravel Pits Submitted to the State Engineer Pursuant to SB 89-120 & SB 93-260, [online], Aug. 1999. Retrieved from http://water.state.co.us/wateradmin/pits.asp, 10 pages.
Global Environment & Technology Foundation. Market Assessment Protective Underground Barrier Technologies [online]. [Retrieved on Feb. 14, 2008]. Retrieved from http://www.gnet.org/helpcenter/barrier.doc, 44 pages.
Halepaska, John C. Case History of Aquifer Storage and Recovery in the Denver Basin Aquifers. Environmental Geology, Sep. 29, 2004, pp. 1-15.
HBH. Memo re: Policy on Application Reviews Involving Lined Sand and Gravel Pits. State of Colorado, Mar. 29, 2000, pp. 1-8.
Hieroglyphic Mountains Recharge Project [online]. 2003. Retrieved from http://www.cap-az.com/static/index.cfm?contentID=64, 7 pages.
Issue Notification dated Mar. 20, 2007 in U.S. Appl. No. 11/064,548, 18 pages.
Johnson, A. Ivan, et al. Hydraulic Barriers in Soil and Rock. ASTM Special Technical Publicaton 874. Dated Jun. 25, 1984, 335 pages.
Kiersch, George A. Environmental/Engineering Geology of Alluvial Settings. Engineering Geology 45, 1996, pp. 325-346.
Land and Water Integration and River Basin Management [online]. Proceedings of an FAO Informal Workshop, Rome Italy, Jan. 31-Feb. 2, 1993, pp. 1-11. Retrieved from http://www.fao.org//docrep/V5400E/V5400E0c.htm.
Land and Water Integration and River Basin Management. Proceedings of an FAO Informal Workshop, Rome Italy, Jan. 31-Feb. 2, 1993, pp. 1-11.
Literature Search: Fate of Micro biota During Waste Aquifer Storage Recovery (ASR), [online], [retrieved on Feb. 8, 2008]. Retrieved from http://www.asrforum.com/fatestudy/wunitedstate.html, 8 pages.
Long, Michael B. et al. Guide to Specification Preparation for Slurry Walls and Clay Liners As A Component of a Colorado Mined Land Reclamation Permit. Colorado Department of Natural Resources Division of Minerals and Geology, Sep. 2000, pp. 1-13.
Pearlman, Leslie. Subsurface Containment and Monitoring Systems: Barriers and Beyond (Overview Report). National Network of Environmental Management Studies Fellow, Mar. 1999, pp. 1-21.
Proceedings Conference on Water Spreading for Ground-Water Recharge. Committee on Research in Water Resources University of California, Mar. 19, 1957, pp. 1-8.
Prospects for Managed Underground Storage of Recoverable Water. The National Academies, Oct. 2007, pp. 1-4.
Pyne, David, Aquifer Storage Recovery: A Guide to Groundwater Recharge Through Wells. Autographed copied, with invoice and check. Dated Jun. 4, 2008, 4 pages.
Ray, Chittaranjan, et al. Riverbank Filtration Improving Source-Water Quality. Kluwer Academic Publishers, 2003, 6 pages.
Resume of Applications and Amended Applications. Water Clerk for Water Division No. 1, Feb. 2001, pp. 1-17.
Resume of Applications and Amended Applications. Water Clerk for Water Division No. 1, Jan. 2001, pp. 1-10.
Rocky Mountain Consultants, Inc. Construction Observation Report Koenig Pit Slurry Wall. Prepared for Hall-Irwin Construction, RMC Job No. 19-0636.022.00, Sep. 1999, 29 pages.
Rocky Mountain Consultants, Inc, Geotechnical and Design Report for the Westminster Lake Project. RMC Job No. 19-0407.019.00, Apr. 1994, pp. 1-7.
Rocky Mountain Consultants, Inc. Herbst Gravel Pit Ponds Slurry Wall Construction Report. RMC Job No. 19-0636.009.00, Jun. 1992, pp. 1-11.
Rocky Mountain Consultants, Inc. Perimeter Drain Plan Westminster Lake Project. SEO File No. C-1740, As Constructed Nov. 15, 1995, pp. 1-2.
Rocky Mountain Consultants Inc. Construction Plans for: Cooley Gravel Dahlia Pit Slurry Wall Water District No. 2 Water Division No. 1, Adams County, Colorado. Job No. 19-0636.010.00Nov. 1992, 9 pages.
Rocky Mountain Consultants, Inc. Construction Observation Report 83rd Avenue Slurry Wall. RMC Job No. 19-0636.015.01, Jun. 2001, pp. 1-26.
Rocky Mountain Consultants, Inc. Construction Plans for 83rd Avenue Slurry Wail. RMC Job No. 19-0636.015.01, Mar. 2001, pp. 1-4.
Rocky Mountain Consultants, Inc. Preliminary Geotechnical And Design Report 83rd Avenue Slurry Wall. RMC Job No. 19-0636.015.00, Oct. 1994, pp. 1-77.
Schreuder, Peter and Dumeyer, John, Feasibility of Natural Treatment and Recharge of Wastewater and Surface Waters Using Mined Phosphate Lands: A Concept to Expand Regional Water Resource Availability. Publication No. 03-113-186 FIPR, Jul. 2002, pp. 1-60.
Schroeder, Dewayen R. Analytical Stream Depletion Model. Colorado Division of Water Resources Office of the State Engineer, Sep. 1987, 24 pages.
Section 5: Seasonal Storage and Conjunctive Use Alternatives. Assessment of Long-Term Water Supply Alternatives, Cambria Community Services District, Aug. 23, 2004, pp. 43-51.
South Metro Water Supply Study Executive Summary. Prepared for The South Metro Water Supply Study Board. Dec. 2003, 20 pages.
Spooner, Philip et al. Slurry Trench Construction for Pollution Migration Control. Noyes Publications, Feb. 1985, pp. 4-7, 57-59.
State Engineer Guidelines for Lining Criteria for Gravel Pits, [online], Aug. 1999, [retrieved on Sep. 7, 2000]. Retrieved from http://water.state.co.us/pits.htm, 3 pages.

Topper, R. et al. Artificial Recharge of Ground Water in Colorado—A Statewide Assessment. Colorado Geological Survey Division of Minerals and Geology Department of Natural Resources, 2004, pp. 1-5.
Water 2025: Preventing Crises and Conflict in the West. Biodiviserity, May 5, 2003, Retrieved from http://biodiversity.ca.gov/Meetings/archive/water03/water2025.pdf, 27 pages.
Xanthakos, Petros P. Slurry Walls. Chapter One—State of the Art. McGraw-Hill Book Company, 1979, pp. 1-4.
Xanthakos, Petros P. Underground Construction in Fluid Trenches. National Educational Seminar, Apr. 1974, pp. 1-7.
Exhibit A for Complaint for Declaratory Judgment of Non-Infringement, Invalidity, and Unenforceablility (Jury Trial Demanded), filed Nov. 9, 2007, pp. 1-18.
Exhibit B for Complaint for Declaratory Judgment of Non-Infringement, Invalidity, and Unenforceablility (Jury Trial Demanded), filed Nov. 9, 2007, pp. 1-17.
Trout, Witwer & Freeman, P.C., Acquiring, Using, and Protecting Water in Colorado, 2004, 19 pages.
Colorado Water Law Benchbook, First Ed., Carrie L. Ciliberto, Managing Editor, Supplemented Mar. 2007, Published by: Continuing Legal Education in Colorado, Inc., Colorado Bar Association CLE, Denver Bar Association, 7 pages.
Raw Water Supply Yield Analysis City of Loveland, Spronk Water Engineer, Inc., Dec. 15, 2004 (Spronk), 62 pages.
40 CFR § 144 et sec, (Jul. 1, 2002 Edition), 67 pages.
42 USC § 300f et sec, (2003), 6 pages.
Exhibits in Support of Statement, Amended Exhibit 12 to Statement of Undisputed Fact in Support of Plaintiffs' Motion for Summary Judgment by Counter Defendants, filed Dec. 8, 2008, 15 pages.
Devlin, J.F. and Parker, B.L. Optimum Hydraulic Conductivity to Limit Contaminant Flux Through Cutoff Walls. Ground Water, vol. 34, No. 3, Jul.-Aug. 1996, pp. 719-726.
Hall-Irwin Construction Company. Plans for the Construction of Herbst Gravel Pit Ponds. Water District No. 3, Water Division No. 1, Weld County, Colorado, Jul. 1990, pp. 1-5. Best available copy.
Plaintiff's Motion for Summary Judgment of Non-Infringement of U.S. Patent 7,192,218 and Brief in Support of Same, filed Oct. 7, 2008, 21 pages.
Plaintiff's Motion for Summary judgment of Non-Infringement of U.S. Patent No. 6,840,710 and Brief in Support of Same, filed Oct. 7, 2008, 21 pages.
Operation and Accounting for Porosity Storage Reservoirs, [online]. Colorado Division of Water Resources, May 1, 2007. Retrieved from water.state.co.us/pubs/pdf/porosity.pdf, 4 pgs.
Reply to Defendant's Response to Motion for Summary Judgment of Non Infringement of U.S. Patent No. 7,192,218, filed Dec. 8, 2008, 11 pages.
Reply to Defendant's Response to Motion for Summary Judgment of Non-Infringement of U.S. Patent No. 6,840,710, filed Dec 8, 2008, 11 pages.
Reply to Defendant's Response to Statement of Undisputed Facts in Support of Plaintiff's Motion for Summary Judgment of Non-Infringement of US Patent No. 7,192,218, filed Dec. 8, 2008, 64 pages.
Reply to Response to Statement of Undisputed Facts in Support of Plaintiff's Motion for Summary Judgment of Non-Infringement of US Patent 6,840,710, filed Dec. 8, 2008, 82 pages.
Defendant's Response to Motion for Summary Judgment of Non-Infringement of U.S. Patent No. 7,192,218, filed Nov. 17, 2008, 16 pages.
Defendant's Response to Motion for Summary Judgment of Non-Infringement of U.S. Patent No. 6,840,710, filed Nov. 17, 2008,16 pages.
Defendant's Response to Statement of Undisputed Facts in Support of Plaintiff's Motion for Summary Judgment of Non-Infringement of U.S. Patent no. 7,192,218, filed Nov. 17, 2008, 153 pages.
Defendant's Response to Statement of Undisputed Facts in Support of Plaintiff's Motion for Summary of Non-Infringement of U.S. Patent No. 6,840,710, filed Nov. 17, 2008, 180 pages.
Statement of Undisputed Facts in Support of Plaintiff's Motion for Summary Judgment of Non-Infringement of Patent No. 6,840,710, filed Oct. 7, 2008, 245 pages.
Statement of Undisputed Facts in Support of Plaintiff's Motion for Summary Judgment of Non-Infringement of U.S. Patent No. 7,192,218, filed Oct. 7, 2008, 159 pages.
Request for Ex Parte Reexamination of U.S. Patent No. 6,840,710 (Reexamination U.S. Appl. No. 90/009,713) filed Mar. 31, 2010, 85 pages.
Exhibit 2 in Request for Ex Parte Reexamination of U.S. Patent No. 6,840,710, filed Mar. 31, 2010 (Reexamination U.S. Appl. No. 90/009,713): Statement Pointing Out the Substantial New Questions of Patentability, 3 pages.
Exhibit 3 in Request for Ex Parte Reexamination of U.S. Patent No. 6,840,710, filed Mar. 31, 2010 (Reexamination U.S. Appl. No. 90/009,713): Office Action dated Jun. 5, 2003 in U.S. Appl. No. 10/147,184, 9 pages.
Exhibit 4 in Request for Ex Parte Reexamination of U.S. Patent No. 6,840,710, filed Mar. 31, 2010 (Reexamination U.S. Appl. No. 90/009,713): Response to Office Action dated Sep. 5, 2003 in U.S. Appl. No. 10/147,184, 14 pages.
Exhibit 5 in Request for Ex Parte Reexamination of U.S. Patent No. 6,840,710, filed Mar. 31, 2010 (Reexamination U.S. Appl. No. 90/009,713): Declaration of Stanley R. Peters Pursuant to 37.C.F.R. 1.132, 14 pages.
Exhibit 6 in Request for Ex Parte Reexamination of U.S. Patent No. 6,840,710, filed Mar. 31, 2010 (Reexamination U.S. Appl. No. 90/009,713): Office Action dated Dec. 3, 2003 in U.S. Appl. No. 10/147,184, 6 pages.
Exhibit 7 in Request for Ex Parte Reexamination of U.S. Patent No. 6,840,710, filed Mar. 31, 2010 (Reexamination U.S. Appl. No. 90/009,713): Response to Office Action dated Jun. 2, 2004 in U.S. Appl. No. 10/147,184, 14 pages.
Exhibit 8 in Request for Ex Parte Reexamination of U.S. Patent No. 6,840,710, filed Mar. 31, 2010 (Reexamination U.S. Appl. No. 90/009,713): Declaration of Carmine Iderola Pursuant to 37.C.F.R. 1.132, 8 pages.
Exhibit 9 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 32 pages.
Exhibit 10 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 43 pages.
Exhibit 11 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 35 pages.
Exhibit 12 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 14 pages.
Exhibit 13 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 42 pages.
Exhibit 14 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 35 pages.
Exhibit 15 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 44 pages.
Exhibit 16 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 61 pages.
Exhibit 17 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 21 pages.

Exhibit 18 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 9 pages.

Exhibit 19 in Request for Ex Parte Reexamination of U.S. Patent No. 6,840,710, filed Mar. 31, 2010 (Reexamination U.S. Appl. No. 90/009,713): U.S. Patent No. 6,840,710—Claim Analysis Table, 26 pages.

Exhibit 20 in Request for Ex Parte Reexamination of U.S. Patent No. 6,840,710, filed Mar. 31, 2010 (Reexamination U.S. Appl. No. 90/009,713): Slurry Trench Construction for Pollution Migration Control, EPA-540/2-84-001, Feb. 1984, 258 pages.

Exhibit 21 in Request for Ex Parte Reexamination of U.S. Patent No. 6,840,710, filed Mar. 31, 2010 (Reexamination U.S. Appl. No. 90/009,713): Department of the Army: U.S. Army Corps of Engineers, Engineering and Design, Technical Guidelines for Hazardous and Toxic Waste Treatment and Cleanup Activities, Apr. 30, 1994, 374 pages.

Exhibit 23 in Request for Ex Parte Reexamination of U.S. Patent No. 6,840,710, filed Mar. 31, 2010 (Reexamination U.S. Appl. No. 90/009,713): Engineering Bulletin- Slurry Walls, EPA-540/S-92/008, Oct. 1992, 9 pages.

Exhibit 26 in Request for Ex Parte Reexamination of U.S. Patent No. 6,840,710, filed Mar. 31, 2010 (Reexamination U.S. Appl. No. 90/009,713): EPA Superfund Record of Decision: Ninth Avenue Dump, Gary, IN, EPA/ROD/R05-88/071, Sep. 20, 1988, 45 pages.

Exhibit 27 in Request for Ex Parte Reexamination of U.S. Patent No. 6,840,710, filed Mar. 31, 2010 (Reexamination U.S. Appl. No. 90/009,713): EPA Superfund, Explanation of Significant Differences: Ninth Avenue Dump, Gary, IN, Oct. 01, 1991, EPA/ESD/R05-92/504, 1992, 9 pages, 10 pages.

Exhibit 28 in Request for Ex Parte Reexamination of U.S. Patent No. 6,840,710, filed Mar. 31, 2010 (Reexamination U.S. Appl. No. 90/009,713): EPA Superfund, Record of Decision Amendment: Ninth Avenue Dump, Gary IN, Sep. 13, 1994, EPA/AMD/R05-94/260, 1994, 25 pages.

Exhibit 29 in Request for Ex Parte Reexamination of U.S. Patent No. 6,840,710, filed Mar. 31, 2010 (Reexamination U.S. Appl. No. 90/009,713): Henk M. Haitjema, "Analytic element modeling of groundwater flow", 1995, pp. 57-59, 67-70, 152-153, 138, 13 pages.

Exhibit 30 in Request for Ex Parte Reexamination of U.S. Patent No. 6,840,710, filed Mar. 31, 2010 (Reexamination U.S. Appl. No. 90/009,713): Manual of Patent Examining Procedure, Original Eighth Edition, Aug. 2001, Latest revision Jul. 2008; Section 2143 - 2143.02, 16 pages.

Request for Ex Parte Reexamination of U.S. Patent No. 7,192,218 (Reexamination U.S. Appl. No. 90/009,712), filed Mar. 31, 2010, 89 pages.

Exhibit 3 in Request for Ex Parte Reexamination of U.S. Patent No. 7,192,218, filed Mar. 31, 2010 (Reexamination U.S. Appl. No. 90/009,712): Statement pointing out the Substantial New Questions of Patentability, 4 pages.

Exhibit 4 in Request for Ex Parte Reexamination of U.S. Patent No. 7,192,218, filed Mar. 31, 2010 (Reexamination U.S. Appl. No. 90/009,712): Office Action dated Mar. 16, 2006 in U.S. Patent Application No. 11/064,548, 6 pages.

Exhibit 5 in Request for Ex Parte Reexamination of U.S. Patent No. 7,192,218, filed Mar. 31, 2010 (Reexamination U.S. Appl. No. 90/009,712): Amendment and Response to Restriction Requirement dated Apr. 17, 2006 in U.S. Appl. No. 11/064,548, 6 pages.

Exhibit 6 in Request for Ex Parte Reexamination of U.S. Patent No. 7,192,218, filed Mar. 31, 2010 (Reexamination U.S. Appl. No. 90/009,712): Office Action dated Jun. 16, 2006 in U.S. Appl. No. 11/064,548 dated Jun. 16, 2006, 5 pages.

Exhibit 7 in Request for Ex Parte Reexamination of U.S. Patent No. 7,192,218, filed Mar. 31, 2010 (Reexamination U.S. Appl. No. 90/009,712): Amendment and Response to Office Action dated Oct. 13, 2006 in U.S. Appl. No. 11/064,548, 12 pages.

Exhibit 10 in Request for Ex Parte Reexamination of U.S. Patent No. 7,192,218, filed Mar. 31, 2010 (Reexamination U.S. Appl. No. 90/009,712): C. Ray, G. Melin and R. Linsky, "Riverbank Filtration-Improving Source-Water Quality," vol. 43, 2003, Kluwer Academic Publishers, 131 pages.

Exhibit 11 in Request for Ex Parte Reexamination of U.S. Patent No. 7,192,218, filed Mar. 31, 2010 (Reexamination U.S. Appl. No. 90/009,712): R.A. Sheets, RA. Darner, B.L. Whitteberry, Lag times of bank filtration at a well field, Cincinnati, Ohio, USA, Journal of Hydrology 266 (2002), pp. 162-174, 33 pages.

Exhibit 12 in Request for Ex Parte Reexamination of U.S. Patent No. 7,192,218, filed Mar. 31, 2010 (Reexamination U.S. Appl. No. 90/009,712): K. M. Hiscock, T. Grischek, Attenuation of groundwater pollution by bank filtration, Journal of Hydrology 266 (2002) pp. 139-144, 7 pages.

Exhibit 15 in Request for Ex Parte Reexamination of U.S. Patent No. 7,192,218, filed Mar. 31, 2010 (Reexamination U.S. Appl. No. 90/009,712): C. Schmidt, Experiences with riverbank filtration and infiltration in Germany, 2003, 18 pages.

Exhibit 16 in Request for Ex Parte Reexamination of U.S. Patent No. 7,192,218, filed Mar. 31, 2010 (Reexamination U.S. Appl. No. 90/009,712): U.S. Patent No. 7192,218—Claim Analysis Table, 54 pages.

Exhibit 17 in Request for Ex Parte Reexamination of U.S. Patent No. 7,192,218, filed Mar. 31, 2010 (Reexamination U.S. Appl. No. 90/009,712): U.S. Patent No. 7,192,218—Claim Analysis Table, 52 pages.

Exhibit 18 in Request for Ex Parte Reexamination of U.S. Patent No. 7,192,218, filed Mar. 31, 2010 (Reexamination U.S. Appl. No. 90/009,712): U.S. Patent No. 7,192,218—Claim Analysis Table, 51pages.

Exhibit 19 in Request for Ex Parte Reexamination of U.S. Patent No. 7,192,218, filed Mar. 31, 2010 (Reexamination U.S. Appl. No. 90/009,712): U.S. Patent No. 7,192,218—Claim Analysis Table, 49 pages.

Exhibit 20 in Request for Ex Parte Reexamination of U.S. Patent No. 7,192,218, filed Mar. 31, 2010 (Reexamination U.S. Appl. No. 90/009,712): U.S. Patent No. 7,192,218—Claim Analysis Table, 53 pages.

Exhibit 21 in Request for Ex Parte Reexamination of U.S. Patent No. 7,192,218, filed Mar. 31, 2010 (Reexamination U.S. Appl. No. 90/009,712): U.S. Patent No. 7,192,218—Claim Analysis Table, 51 pages.

Exhibit 22 in Request for Ex Parte Reexamination of U.S. Patent No. 7,192,218, filed Mar. 31, 2010 (Reexamination U.S. Appl. No. 90/009,712): U.S. Patent No. 7,192,218—Claim Analysis Table, 37 pages.

Exhibit 23 in Request for Ex Parte Reexamination of U.S. Patent No. 7,192,218, filed Mar. 31, 2010 (Reexamination U.S. Appl. No. 90/009,712): U.S. Patent No. 7,192,218—Claim Analysis Table, 36 pages.

*City of Aurora* and *Grimm Construction Company, Inc.* v. *PS Systems, Inc.* and *RAR Group, LLC*, Civil Action No. 07-cv-02371-PAB-BNB, Order Regarding Claim Construction, dated Jun. 2, 2010, 44 pages.

* cited by examiner

MAINTAINING DYNAMIC WATER STORAGE IN UNDERGROUND POROSITY RESERVOIRS

RELATED APPLICATIONS

This application claims priority from U.S. Provisional Application No. 60/847,143, filed Sep. 26, 2006, which is hereby incorporated herein by reference.

FIELD OF THE INVENTION

This application relates generally to a method of maximizing water storage within underground alluvial reservoirs, and more particularly to a method of dynamically storing water within an elevated wedge portion of the reservoir that lies above a maximum static water level of the reservoir.

BACKGROUND OF THE INVENTION

It is becoming increasingly difficult, both in terms of cost and site availability, to construct conventional open reservoirs for the storage of water. Such reservoirs typically require the construction of a dam across a river, thereby flooding vast expanses of land upstream of the dam while severely curtailing the flow of water downstream from the dam. In light of the increasing value of water and the complexities of the various water laws across different jurisdictions, it is becoming prohibitively difficult to form an open reservoir in this manner.

A further disadvantage of open reservoirs is the high degree of evaporative losses experienced by such reservoirs due to the relatively large air/water interface. Specifically, in arid climates (such as those found in the Western United States), open reservoirs are subject to extremely large evaporative losses. Indeed, such evaporative losses are typically greatest where water is needed most.

Underground porosity reservoirs, such as those described in U.S. Pat. No. 6,840,710 to Peters et al., titled UNDERGROUND ALLUVIAL WATER STORAGE RESERVOIR AND METHOD, have been posited as an alternative to open reservoirs. Underground porosity reservoirs include a volume of porous material, such as natural alluvium, bounded by substantially impermeable walls to create an underground vessel capable of storing water. Underground reservoirs are not subject to evaporation losses and can potentially be used without the loss of surface use of the site.

Methods of operating an underground porosity reservoir are described in co-pending U.S. patent application Ser. No. 10/704,347, titled METHOD OF OPERATING A WATER STORAGE RESERVOIR HAVING POROSITY STORAGE, filed Nov. 7, 2003, which is incorporated herein by reference. Following initial steps of building the substantially impermeable walls and pumping entrapped water back to the surrounding groundwater system, the porosity storage reservoir is typically filled to capacity and then emptied to determine the net storage capacity of the reservoir. Filling the reservoir to capacity typically produces water levels within the reservoir that are higher than would otherwise occur naturally within the alluvium. Depending on the amount of fine-grained materials existing between the sand and gravel particles, several filling cycles may be required to flush out these relatively fine materials and thereby increase the net capacity of the porosity reservoir.

In order to maximize the storage capacity of a porosity reservoir, it is necessary to fill the reservoir to its highest level. However, the dimensions of a porosity reservoir may be vast (e.g., hundreds of acres of surface area and thousands of acre-feet in volume), and thus the surface of the land encompassed by the substantially impermeable walls may be gently sloped as opposed to level. This tendency is only amplified due to the fact that porosity reservoirs are typically constructed within the alluvial soils of a river bed so that there is an "upstream" and "downstream" portion to the reservoir corresponding to the overall valley gradient. In one example, if a porosity reservoir has an average depth of 50 feet but the surface level of the reservoir drops 10 feet from the upstream to the downstream end of the reservoir, it can be presumed that approximately ten percent of the overall volume of the porosity reservoir is not used when the reservoir is filled to the maximum level of the "downstream" end of the reservoir (i.e., an average of 5 feet from the upstream to the downstream end divided by the 50-foot depth). That is, when the reservoir is filled to capacity in a static state so that there is no water flow through the reservoir, the water level will be no higher than the height of the lowest "top" elevation at the downstream end of the reservoir. The portion of the reservoir that extends above this maximum static water level is referred to herein as the "wedge" since it constitutes a generally wedge-shaped portion when viewed in a section extending from the upstream to the downstream portion of the porosity reservoir.

In order to maximize the amount of water that can be stored within the underground porosity reservoir, an improved system is needed to store water in the wedge portion of the reservoir (i.e., recover some or all of the ten percent loss described above). It is with respect to these and other background considerations, limitations and problems that the present invention has evolved.

SUMMARY OF THE INVENTION

The present invention includes an underground porosity reservoir for storing water in alluvial deposits, wherein the reservoir is formed by one or more substantially water-impermeable barriers and an aquiclude that surround a volume of alluvial materials, so that water can be stored within the spaces or pores between the alluvial materials. Due to a natural gradient of the land where porosity reservoir is formed (e.g., along a river bed), the reservoir defines an upstream end and a downstream end. A static portion of the reservoir is defined as that portion that extends below an elevation of the downstream end of the reservoir. An elevated, wedge-shaped portion of the reservoir thus extends above the static portion of the reservoir. In order to store water within the wedge portion of the reservoir, water must be dynamically (i.e., continuously or periodically) moved through the wedge portion of the porosity reservoir. Thus, the present invention utilizes means for removing water from the downstream end of the reservoir at a first flow rate, as well as means for adding water to the upstream end of the reservoir at a second flow, wherein the first and second flow rates are substantially equal in order to the maintain water stored within the wedge portion of the reservoir.

In one preferred embodiment, water is pumped from the downstream end of the reservoir and reintroduced to the upstream end of the reservoir, thereby ensuring that the first and second flow rates are equal. In other embodiments, the dynamic flow of water is transported out of the downstream end of the reservoir at a first flow rate, while water from outside of the porosity reservoir is transferred to the upstream end of the reservoir at a second flow rate that is substantially equal to the first flow rate. The external water may be pumped to the upstream end of the reservoir (e.g., from an alluvial well), or the external water may be passively transferred from a collection point upstream of the reservoir. Additionally, the means for removing water from the downstream end of the reservoir and/or the means for adding water to the upstream end of the reservoir may comprise a plurality of collection/distribution points arranged at different depths and/or positions within the reservoir to promote mixing of water within the reservoir.

These and various other features as well as advantages which characterize the present invention will be apparent from a reading of the following detailed description and a review of the associated drawings.

DETAILED DESCRIPTION

Figure 1:
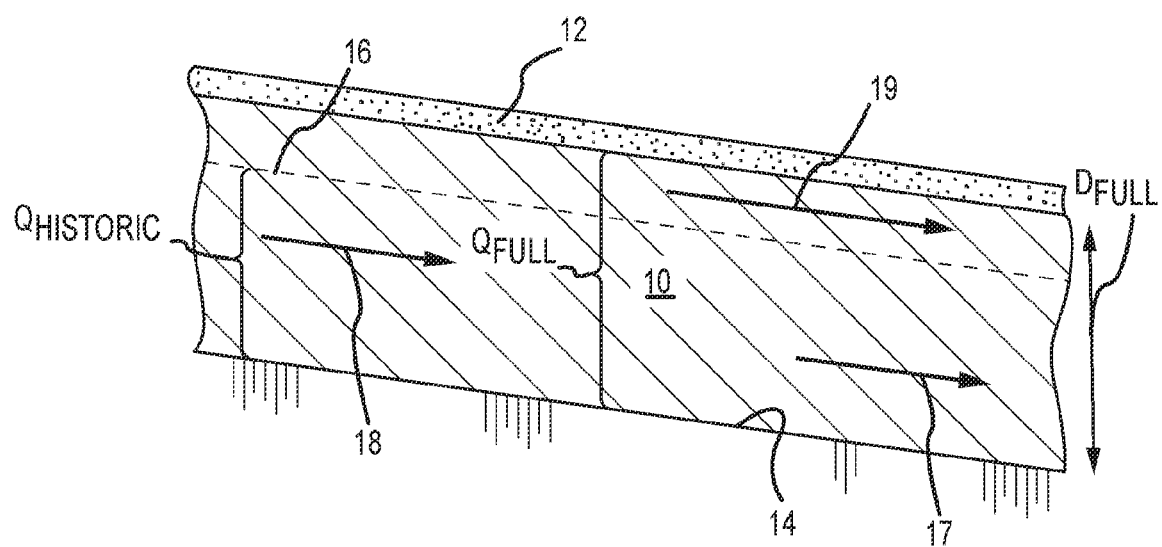
FIG. 1 is a generalized section view of groundwater flow through alluvial material, wherein two separate flow rates are designated based on the depth of the water within the alluvial deposits.

FIG. 1 illustrates a generalized flow of groundwater through alluvial deposits 10 (e.g., a layer of sand and gravel), such as might be found along a river bed. While FIG. 1 shows that both a surface level 12 and a bedrock level 14 are formed generally parallel to each other and slope downward in a "downstream" direction, it is understood that the surface level 12 (i.e., the level of a topsoil layer that covers the alluvial deposits 10) may undulate so as to create varying depths between the surface 12 and the bedrock 14. A dashed line 16 represents a historic groundwater level through the alluvial materials, where the groundwater flows in the downstream direction indicated by arrow 17. In particular, FIG. 1 illustrates two separate water flow rates—$Q_{HISTORIC}$ (designated by arrow 18) and $Q_{FULL}$ (designated by arrow 19). $Q_{HISTORIC}$ denotes a lower flow rate of water through the alluvial material 10 at the historical water depth indicated by dashed line 16, while $Q_{FULL}$ denotes a higher flow rate that occurs when the water depth is at a maximum level extending from the topsoil surface 12 to the bedrock bottom 14 (and denoted by the arrow labeled $D_{FULL}$ in FIG. 1). The actual flow rates $Q_{HISTORIC}$ and $Q_{FULL}$ are determined by a number of factors, including the permeability of the alluvial deposits, the slope of the deposit, and the depth of the water (e.g., the depth $D_{FULL}$).

Figure 2:
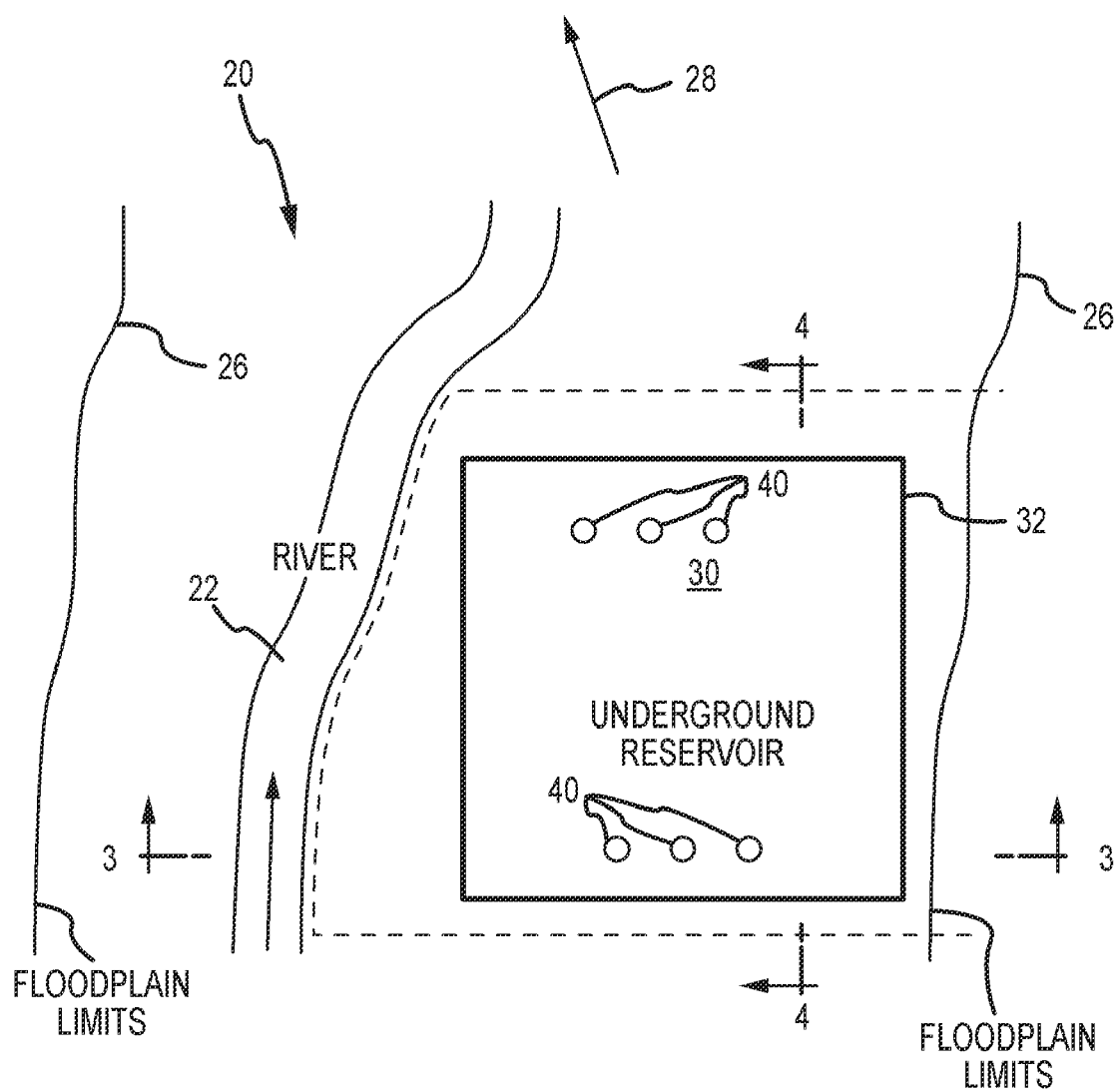
FIG. 2 is a plan view of a typical river basin illustrating a perimeter of an underground porosity reservoir for use with an embodiment of the present invention.

FIG. 2 illustrates an exemplary underground reservoir system in accordance with the present invention. In particular, FIG. 2 illustrates a plan view of an exemplary river system or basin 20 comprising a riverbed 22 that flows along the top of alluvial deposits 10 (FIG. 1) formed within the boundary 26 of a floodplain that extends to either side of the current riverbed 22. An arrow 28 in FIG. 2 illustrates a direction of flow of the groundwater through the alluvial deposits 10. An underground porosity storage reservoir 30 is typically formed with a regular geometric boundary 32. The design, construction and technical aspects of underground reservoirs are the subject of U.S. Pat. No. 6,840,710, titled UNDERGROUND ALLUVIAL WATER STORAGE RESERVOIR AND METHOD, filed on May 15, 2002 and issued on Jan. 11, 2005, which is incorporated herein by reference.

Figure 3:
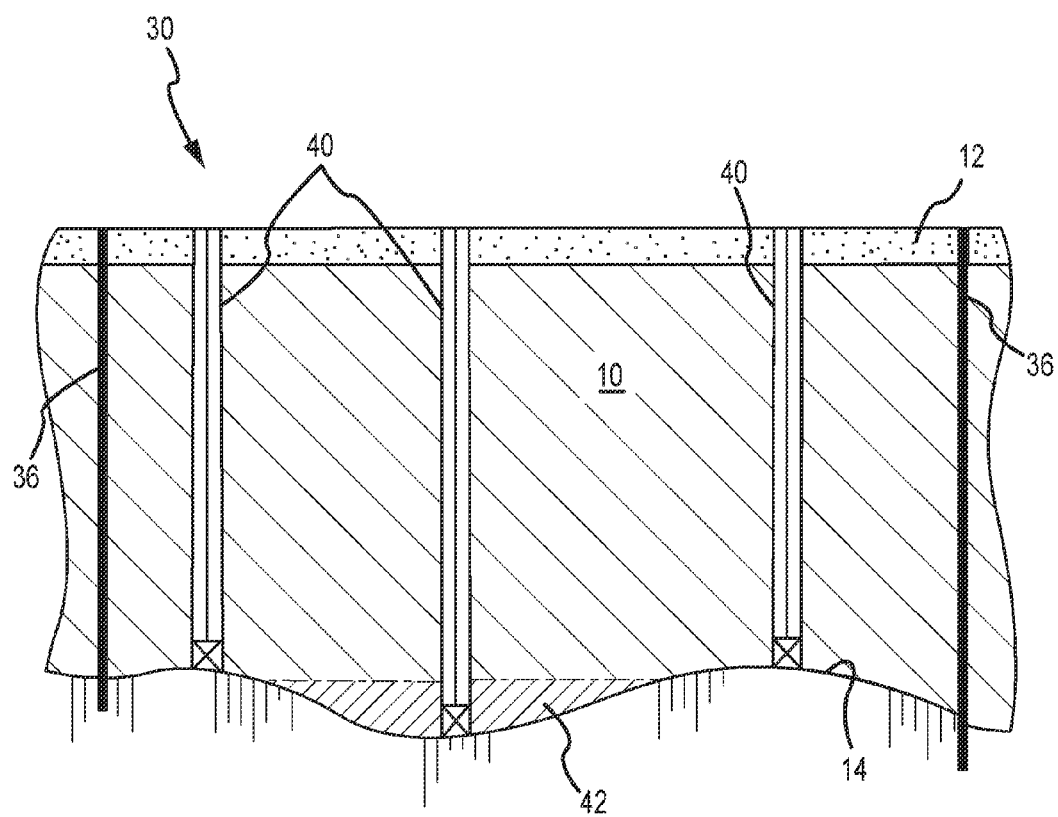
FIG. 3 is a section view of the river basin taken substantially along the line 3-3 in FIG. 2 illustrating the vertical limits of walls used to form the porosity reservoir, where extraction wells may be strategically placed to minimize the impact of dead storage volumes along the bottom of the reservoir.

FIG. 3 illustrates a section view of the underground reservoir 30 shown in FIG. 2, where the section is taken nearly perpendicular to the direction of groundwater flow as indicated by arrow 28. Taking a section in this direction results in a view of the surface level 12 that is substantially level. The reservoir itself is created by bounding a volume of alluvial deposits with one or more sidewalls 36 that follow the perimeter 32 shown in FIG. 2. The walls 36 are substantially water impermeable and are preferably vertical in orientation. In the embodiment shown, the walls 36 are bounded by an aquiclude 14 that extends below the floodplain boundary 26, although other materials and construction techniques may be used. The underground reservoir 30 encloses a volume of natural alluvium 10, and the water storage provided by the reservoir 30 is in the form of porosity storage within the pores of the alluvial material (e.g., sand and gravel). Depending on the type of alluvial material, the usable water storage volume may range from 10% to 40% of the total enclosed volume of the reservoir 30. In an alternative embodiment, a different material, such as imported sand, gravel or recycled concrete, may be used instead of the natural alluvium 10.

In the embodiment shown in FIGS. 2 and 3, multiple extraction wells 40 are utilized to withdraw the stored water from the porosity reservoir 30. In a further embodiment, the wells 40 may also be used to fill the reservoir 30 with water, although other filling methods may include the use of surface ponds or recharge ditches, as well as separate wells that extend to various depths within the reservoir. Various methods of filling the reservoir are described in U.S. Pat. No. 7,192,218, titled DIRECT RECHARGE INJECTION OF UNDERGROUND WATER RESERVOIRS, filed on Feb. 23, 2005 and issued on Mar. 20, 2007, which is incorporated herein by reference. The extraction wells 40 typically extend to the bottom of the reservoir to limit the amount of unrecoverable or "dead" storage at the bottom of the reservoir 30 and thereby maximize net storage capacity. In those instances where the depth of the bedrock or aquiclude layer 14 varies or undulates as shown in FIG. 3, it may be necessary to strategically position one of the extraction wells 40 to access a volume of water 42 that would otherwise fall into the category of "dead" storage.

Figure 4:
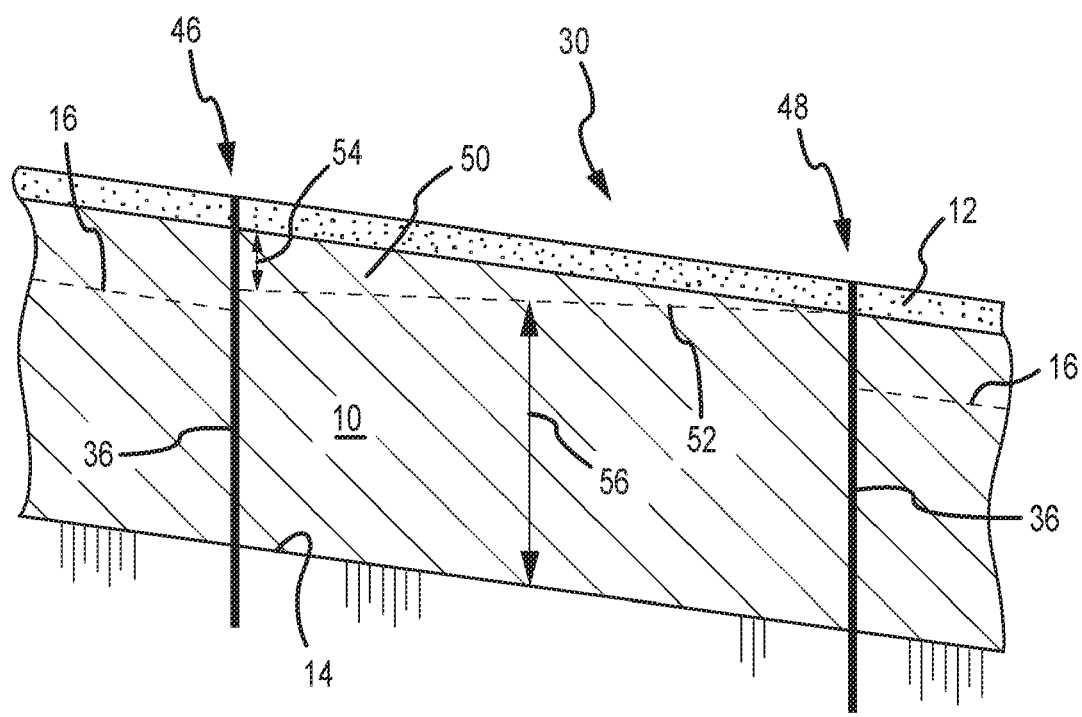
FIG. 4 is a section view of the porosity reservoir taken substantially along the line 4-4 in FIG. 2, illustrating a vertical drop of the reservoir surface in the downstream direction, and further illustrating a wedge volume that extends above a maximum static water storage level within the porosity reservoir.

While precise well positioning may minimize "dead" storage at the bottom of the reservoir 30, the position of the extraction wells has no bearing on lost storage capacity contained within the "wedge" portion of the reservoir as shown in FIG. 4. In particular, the section view of FIG. 4 is taken orthogonally to that of FIG. 3 (i.e., substantially parallel to the direction of groundwater flow as indicated by arrow 28 in FIG. 2) so as to better illustrate an elevated "upstream" end 46 and an opposing "downstream" end 48 of the porosity reservoir 30. A "wedge" portion 50 of the reservoir is denoted by a dashed line 52 that indicates a maximum "static" storage level of water within the porosity reservoir 30. That is, without utilizing the methods of the present invention to dynamically store water within the wedge portion 50 (as described in greater detail below), the static storage line 52 represents the maximum water level that can be maintained for long-term storage within the reservoir 30. Using the numerical values within the above-described example, in one exemplary embodiment the elevation of the upstream end 46 is approximately ten feet above the elevation of the downstream end 48 (as indicated by arrow 54) so that an average depth of the wedge portion is approximately five feet, while an average depth of the reservoir 30 at the "static" storage level 52 is approximately fifty feet (as indicated by arrow 56). Thus, in the example shown in FIG. 4, the volume of storage within the wedge 50 comprises approximately ten percent of the total static storage of the porosity reservoir 30.

In order to maximize the storage capacity of the porosity reservoir 30, it is desirable to store water within the alluvial materials found within the elevated "wedge" portion 50. Such storage is referred to herein as "dynamic storage" since it requires either active pumping or passive (i.e., artificial) recharging to overcome the tendency of water to seek a level surface over time. That is, any water contained within the wedge portion 50 of FIG. 4 (i.e., contained above the static level 52) will tend to flow downhill toward the downstream end 48 of the porosity reservoir 30. This is true regardless of the fact that the entire porosity reservoir 30 has been isolated from the normal groundwater flow by the substantially impermeable walls 36. More particularly, as the level of water within the porosity reservoir 30 rises above the static level 52 the entire water volume within the reservoir will flow downstream at a flow rate Q that is greater than $Q_{HISTORIC}$ but less than $Q_{FULL}$ as those flow rates were described above with respect to FIG. 1. Thus, in the case where the entire wedge portion 50 has been filled with water, the entire water volume within the porosity reservoir 30 will flow downstream at the $Q_{FULL}$ rate. However, because water travels relatively slowly through the porous materials 10, even the $Q_{FULL}$ rate will not result in an immediate emptying of the wedge portion 50, as described in greater detail below. Furthermore, because the maximum ($Q_{FULL}$) rate of water flow within the reservoir 30 is the same as that found within the natural, unbounded alluvium shown in FIG. 1, calculations of this flow rate may be made prior to construction of the porosity reservoir 30. This water flow rate can then be used to determine the size and amount of compensating infrastructure needed to maintain the dynamic capacity within the wedge 50, as described below.

Figure 5:
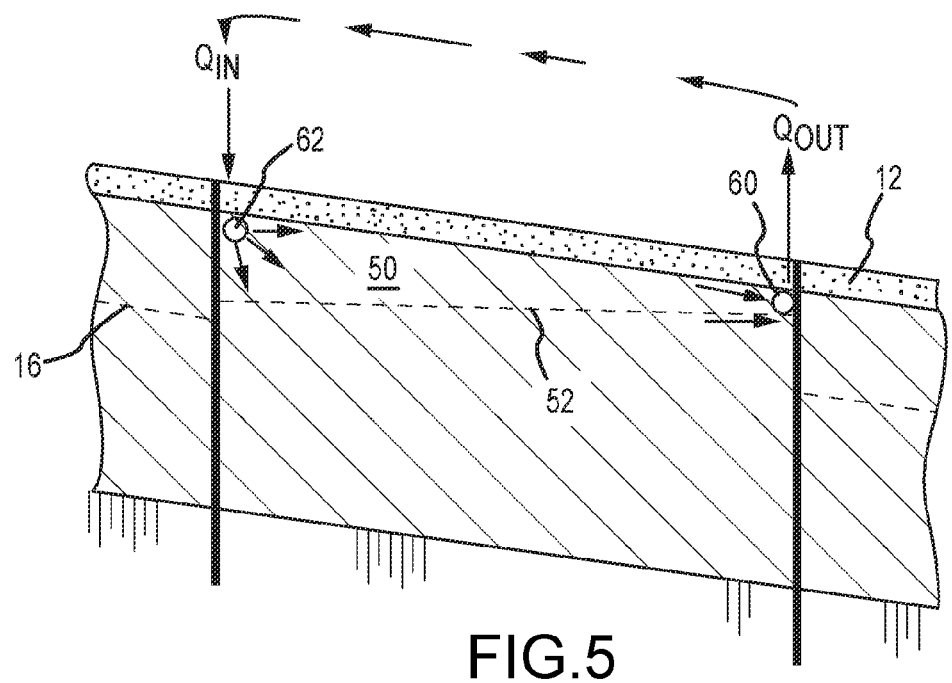
FIG. 5 is a section view of the porosity reservoir similar to FIG. 4 illustrating one embodiment of a system for dynamically storing water within the wedge portion of the reservoir, wherein the water within the porosity reservoir is recirculated.
Figure 6:
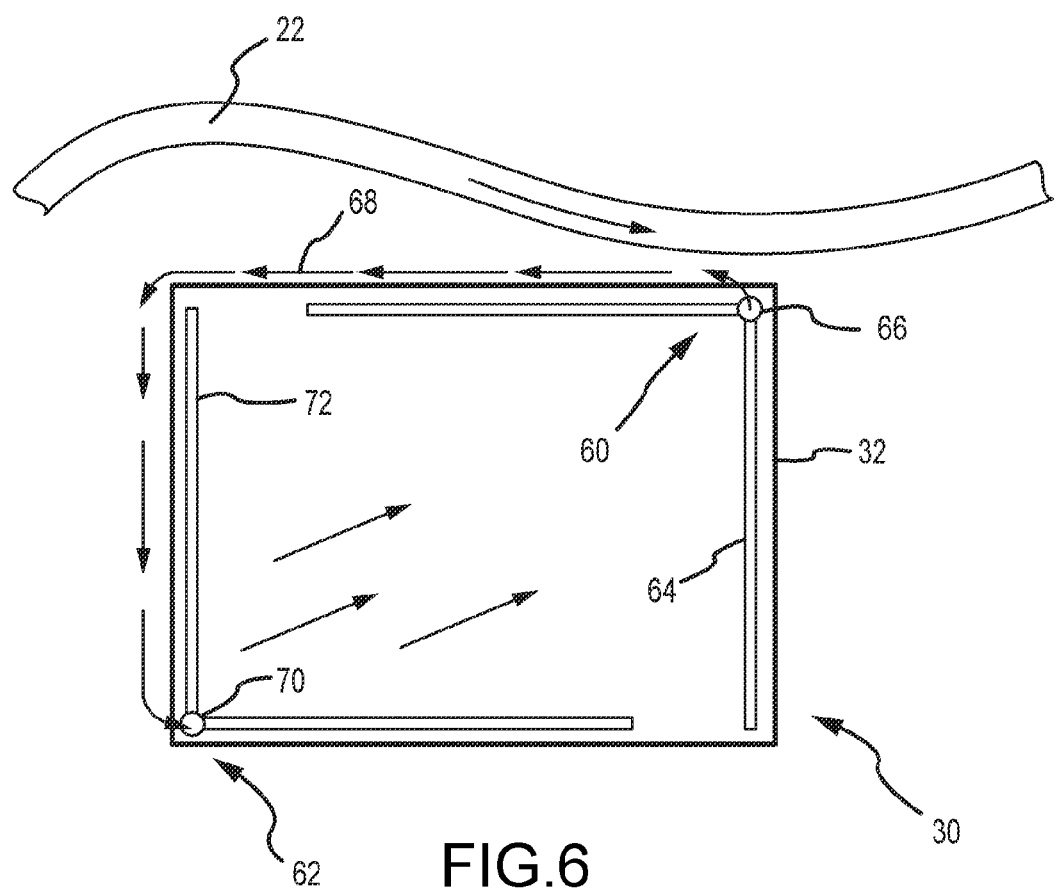
FIG. 6 is a plan view of the porosity reservoir and the dynamic storage system shown in FIG. 5.

A first embodiment of a method for maintaining dynamic storage within the porosity reservoir 30 is described with respect to FIGS. 5 and 6. As described above, dynamic storage of water within the reservoir (i.e., storage within the wedge 50) is only possible when the reservoir water level exceeds the "static" level indicated by line 52 and initiates a flow rate Q within the reservoir 30 (where Q is less than or equal to $Q_{FULL}$). In the embodiment of FIG. 5, a downstream collection system 60 is positioned just below the topsoil 12 (i.e., at the topsoil-alluvial interface) and returns the water to an upstream distribution system 62 that is similarly positioned below the topsoil-alluvial interface. FIG. 6 illustrates a plan view of this first embodiment where the downstream collection system 60 preferably comprises a French drain interceptor 64 (e.g., perforated pipe) arrayed along one or two sides of the reservoir 30 (depending on the direction of the water flow); a sump vessel 66 to store the water collected by the interceptor 64; and a pump to return the stored water to the upstream distribution system 62. The water is preferably pumped through a solid pipeline designated in FIG. 6 by the arrows 68. While the pipeline 68 is shown to run outside of the perimeter 32 of the porosity reservoir 30 in FIG. 6, an alternate embodiment of the pipeline 68 may be positioned within the perimeter of the reservoir 30. Additionally, while FIG. 6 illustrates a perforated pipe 64 as an exemplary means for collecting water within the downstream collection system 60, it is understood that the present invention is not limited to the use of perforated pipes and that one skilled in the art may utilize alternative means for collecting water at the downstream end 48 of the porosity reservoir.

The upstream distribution system 62 similarly comprises a distribution manifold 70 and French drain lines 72 arrayed along the upstream side or corner of the reservoir 30. The upstream distribution system 62 thus serves to refill the water collected by the downstream system 60 and maintain the dynamic flow of water through the porosity reservoir 30. That is, when the porosity reservoir 30 is filled above the static level 52, water is collected by the downstream 60 at first flow rate $Q_{OUT}$ and then pumped back to the upstream system 62 at a second flow rate $Q_{IN}$, where the flow rates $Q_{OUT}$ and $Q_{IN}$ are substantially equal. In this manner, the effective storage capacity of the reservoir 30 is increased over the maximum "static" level indicated by the line 52.

The operation of the pump in the embodiment of FIGS. 5 and 6 may be continuous (i.e., at a relatively low flow rate) or periodic, such as when a predetermined amount of water has been collected within the downstream sump 66. Furthermore, while additional perforated pipes 72 are shown as an exemplary means for distributing water at the upstream system 62, it is understood that the present invention is not limited to the use of perforated pipes and that one skilled in the art may utilize alternative means for returning the collected water to the upstream end 46 of the porosity reservoir. Additionally, while only one collection system 60 and distribution system 62 are shown in FIGS. 5 and 6, alternative embodiments may utilize multiple collection and distribution systems positioned at different depths and positions within the porosity reservoir 30, as described in greater detail below.

Figure 7:
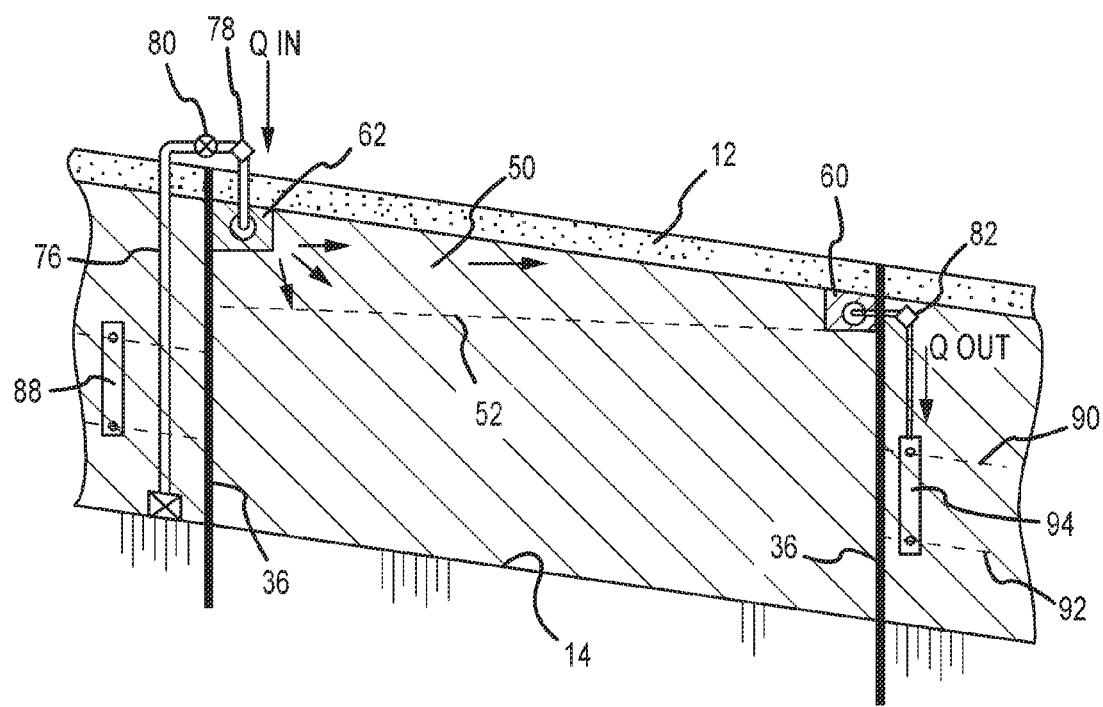
FIG. 7 is a section view illustrating an alternative embodiment of a system for dynamically storing water within the wedge portion of the reservoir, wherein water that is external to the reservoir is introduced into the upstream portion of the reservoir while a similar amount of water is removed from the downstream portion of the reservoir.

An alternate embodiment of present invention shown in FIG. 7 utilizes a flow of "external" water (i.e., water originating from outside of the porosity reservoir 30) to fill the upstream portion of the wedge 50 and thereby maintain the enhanced, dynamic capacity of the porosity reservoir 30. In one embodiment, water on the upstream side of the reservoir is withdrawn from an alluvial well 76 that is positioned outside of the reservoir boundary. The water is then pumped to the upstream distribution system 62 (described in greater detail with respect to FIG. 6) where it is allowed to move downstream through the porosity reservoir 30 for collection at the downstream collection system 60. The water collected by the downstream collection system 60 is then released outside of (e.g., downstream from) the porosity reservoir 30, as shown in FIG. 7.

A flow meter 82 attached to the downstream collection system 60 preferably measures the flow rate $Q_{OUT}$ of water that is dynamically moving through the reservoir 30 (and being released from the reservoir at the downstream collection system 60). A second flow meter 78 is preferably positioned between the alluvial well 76 and the upstream distribution system 62 to measure the flow rate $Q_{IN}$ of water being added to the wedge portion 50 of the porosity reservoir 30. In one embodiment, the flow meter 78 operates a valve 80 to control the water pumped from the alluvial well 76 so that the value of $Q_{IN}$ substantially equals the value of $Q_{OUT}$. Setting the inflow rate equal to the outflow rate ensures that the capacity of the reservoir 30 remains in the "dynamic" range (i.e., above the "static" level 52). Furthermore, as described above, the values of $Q_{IN}$ and $Q_{OUT}$ are less than or equal to $Q_{FULL}$ (where the $Q_{FULL}$ flow rate is only attained when the wedge portion 50 of the reservoir is completely full).

In one embodiment, the dynamic water storage system shown in FIG. 7 may be used in conjunction with a water mitigation system that is utilized to maintain historic water levels both upstream and downstream of the porosity reservoir 30. This type of mitigation system was previously disclosed in U.S. Pat. No. 6,840,710 (incorporated by reference above), and utilizes an upstream collection system 88 having two collection means (e.g., two series of perforated pipes) positioned at both the historic high water level (indicated by dashed line 90) and the historic low water level (indicated by dashed line 92). The upstream mitigation system 88 is connected by pipes to a downstream distribution system 94 so that any water that tends to "dam" at the upstream end of the porosity reservoir 30 (due to the presence of the large, substantially impermeable walls 36 that tends to block the natural ground flow of water) can be routed around the perimeter of the reservoir 30 to the downstream distribution system 94 where the water is then released to maintain historic levels downstream of the reservoir. Additional details of the mitigation system are found within U.S. Pat. No. 6,840,710 and are not repeated herein.

In one embodiment, the dynamic storage system of the present invention works completely separately from the mitigation system, although the dynamic system does reduce the workload of the mitigation system by drawing water from the alluvium upstream of the reservoir 30 that would otherwise be re-routed by the mitigation system. Indeed, in certain embodiments the dynamic storage system shown in FIG. 7 may be used in place of a separate mitigation system (i.e., since the maximum flow rate $Q_{FULL}$ handled by the dynamic system is greater than the typical $Q_{HISTORIC}$ flow rate that is handled by the mitigation system). However, due to the fact that the dynamic system may not operate when the reservoir is run in "static" mode (i.e., the amount of water stored within the reservoir 30 is below the static level 52 so that $Q_{OUT}$ and $Q_{IN}$ are zero), it is preferred that a separate mitigation system be utilized in those situations where the damming of water along the upstream side of the reservoir poses a problem to adjacent landowners.

Alternatively, the dynamic storage system of the present invention may work in conjunction with the mitigation system so that water collected at the downstream collection point 60 is discharged directly to the distribution manifolds (e.g., French drain lines or other alternative distribution systems) of the downstream mitigation system 94. In this manner, separate distribution systems are not needed for both the dynamic storage system of the present invention and the mitigation system. Furthermore, when the reservoir 30 is run in "dynamic" mode (i.e., where the water level is above the static line 52), the water collected by the upstream mitigation system 88 may be routed to the wedge portion 50 at a first flow rate that is substantially equal to the $Q_{HISTORIC}$ flow rate. Because this water is collected at the downstream system 60 (after flowing through the reservoir 30) and shunted to the downstream mitigation system 94, the mitigation system operates in the normal manner to maintain historic water levels upstream of the reservoir. However, in this case, the water collected by the mitigation system is channeled through the reservoir 30 instead of around it. Furthermore, when the water from the mitigation system is shunted to the reservoir, the well 76 (or other source of external water) need only supply water at a lower flow rate $Q_{DYNAMIC}$ that is equal to the difference of the flow rate $Q_{OUT}$ of water collected at the downstream collection system 60 and the substantially $Q_{HISTORIC}$ flow rate of water supplied by the upstream mitigation system 88 (i.e., $Q_{DYNAMIC} = Q_{IN/OUT} - Q_{HISTORIC}$).

Routing external water through the wedge portion 50 to maintain dynamic storage within the porosity reservoir 30 (as shown in FIG. 7) provides benefits over simply recirculating the existing water as described with respect to FIGS. 5 and 6. Specifically, adding "fresh" water to the wedge portion 50 may be preferable to recirculating the same water over and over again. Additionally, although the water provided by the alluvial well 76 has been further filtered by the alluvial materials outside of the reservoir, the water is still compatible (i.e., chemically and thermally) with the water contained within the porosity reservoir 30.

Figure 8:
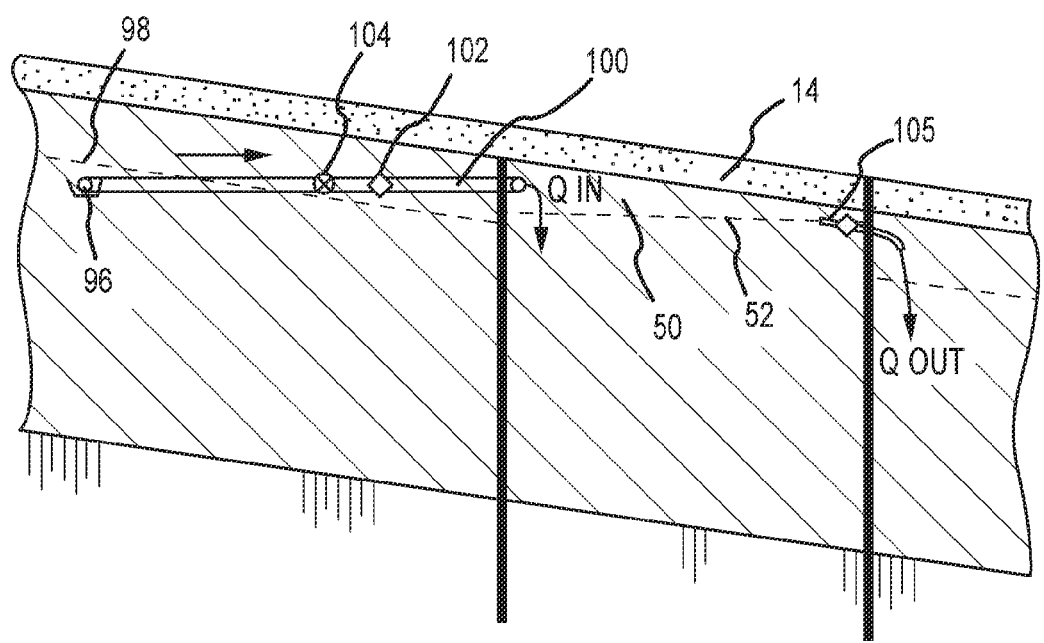
FIG. 8 is a section view illustrating a further embodiment of a system for dynamically storing water within the wedge portion of the reservoir, wherein external water is introduced into the upstream portion of the wedge while a similar amount of water is removed from the downstream portion of the wedge.

A further embodiment of the present invention similarly utilizes water from outside of the porosity reservoir 30, although without the requirement that the water be pumped into the wedge portion 50 of the reservoir. FIG. 8 illustrates one example of a passive recharge system that utilizes a ground water interceptor 96 that is located below the traditional ground water level (as indicated by dashed line 98). The collection system 96 is connected to the upstream portion of the reservoir wedge 50 via a conduit or pipe 100. A flow meter 102 and connected valve 104 are used to regulate the flow of water $Q_{IN}$ added to the wedge portion 50 so that the inflow substantially matches the outflow $Q_{OUT}$ measured by a flow meter 105 at the downstream end of the wedge 50. Additionally, when the water level within the porosity reservoir 30 drops below the static level 52 (so $Q_{OUT}$ equals zero and the reservoir transitions from "dynamic" storage to "static" storage), the valve 104 is completely closed to set $Q_{IN}$ equal to zero and prevent the groundwater interceptor 96 from inadvertently filling the reservoir 30.

Because water is fed by gravity through the pipe 100, the ground water interceptor 96 must be positioned sufficiently far upstream of the porosity reservoir 30 to ensure that it will have access to naturally occurring ground water while still providing for gravity drainage downhill to the wedge portion 50. This may require a pipe 100 having a length on the order of one mile or more, and thus may not be feasible for all applications. However, even given the requirement for the upstream location of the interceptor 96, the passive system shown in FIG. 8 may be preferred to the active (pump-driven) system shown in FIG. 7 due to the added costs related to installing and operating a pump (as well as the loss of the dynamically stored water in the event that the pump stops operating due to a mechanical failure or a power outage). Indeed, the passive system of FIG. 8 may find particular use for porosity reservoirs designed to provide long-term drought protection, where water reserves can be kept for years at a time, since it is desirable to maximize the storage capacity of a reservoir without incurring continual charges for operating a pump.

Alternative methods of passively supplying "external" water to the wedge portion 50 of the reservoir may utilize non-alluvial (e.g., surface) water as opposed to the alluvial water described above with respect to FIGS. 7 and 8. That is, while FIGS. 7 and 8 illustrate two examples of providing external "alluvial" water to the reservoir 30, other types of external water may similarly be used, such as diverting water from the river 22 itself, or drawing water from alternative sources such as surface ponds or recharge ditches. Similar to the system shown in FIG. 8, a non-alluvial dynamic recharge system simply requires that a flow meter 102 and valve 104 be connected between the external water source and the wedge portion 50 to control the flow of external water and ensure that the flow of water $Q_{IN}$ added to the wedge portion 50 substantially matches the outflow $Q_{OUT}$ measured at the downstream end of the reservoir.

Figure 9:
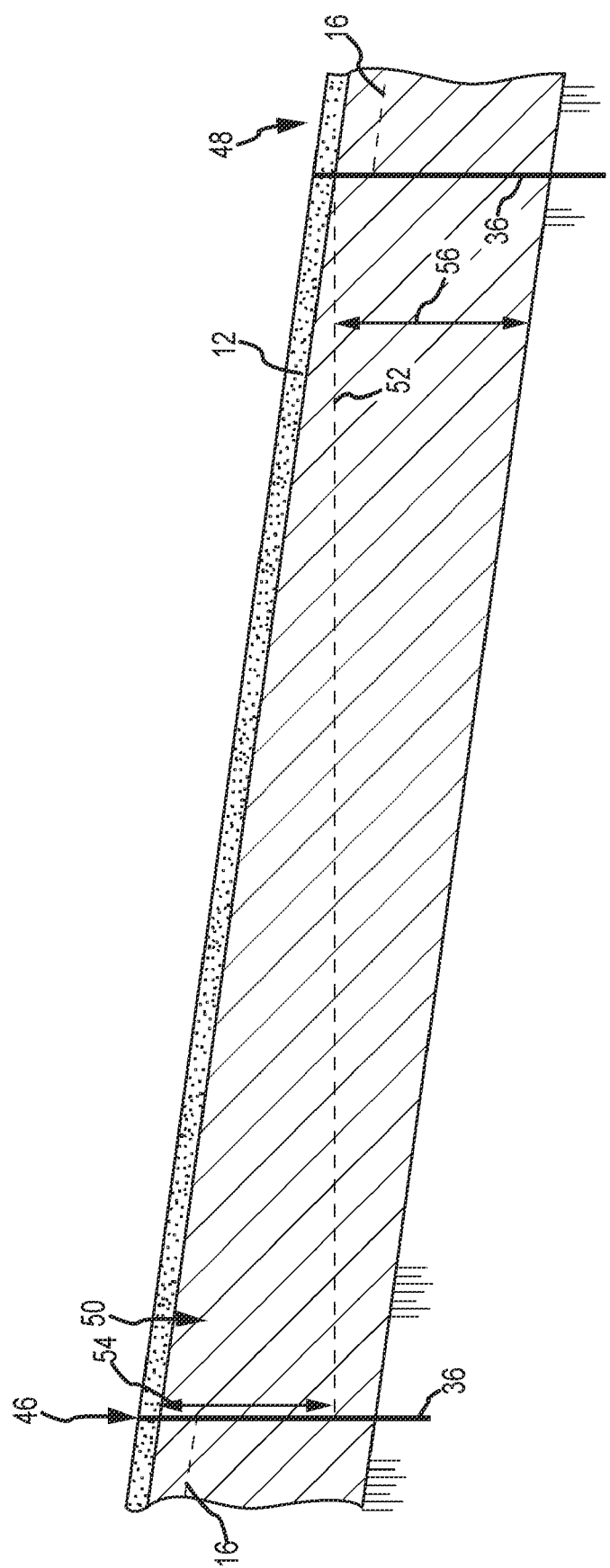
FIG. 9 is a section view similar to FIG. 4, illustrating an alternative embodiment of the porosity reservoir having a greater length dimension than the reservoir shown in FIG. 4 and a commensurately larger wedge portion.

While the methods of adding external water to the porosity reservoir 30 during periods of "dynamic" storage (as shown in FIGS. 7 and 8) are necessary to account for the difference between $Q_{IN/OUT}$ and $Q_{HISTORIC}$, alternative embodiments of the present invention may utilize a different porosity reservoir 30 having either a shallower depth or a greater length in the downstream direction of the groundwater flow. By altering the dimensions of the porosity reservoir 30, it is possible that "dynamic" storage may be obtained at a depth that is equal to or below the natural groundwater level 16, thereby allowing a mitigation system to provide substantially all of the water needed to maintain the desired storage (i.e., $Q_{IN/OUT}=Q_{HISTORIC}$). An example of such a longer reservoir 30 is shown in FIG. 9 where, for a similar depth as the reservoir shown in FIG. 4, the length of the reservoir 30 in FIG. 9 has been approximately tripled in size. As shown in FIG. 9, the dashed line 52 indicating the maximum static depth of the porosity reservoir 30 is below the historic groundwater line 16 outside of the reservoir, and thus it is possible that for certain "dynamic" water levels within the reservoir the flow rates $Q_{IN/OUT}$ may be less than or equal to $Q_{HISTORIC}$. Thus, as described more fully above with respect to FIG. 7, it is possible to size the porosity reservoir 30 so that all of the water needed to maintain at least a minimum level of "dynamic" storage may be provided by the upstream mitigation system 88 (FIG. 7). Such an embodiment may have further advantages for long term water storage since neither an extra passive recharge system (as shown in FIG. 8) nor a well and associated pump (as shown in FIG. 7) would be required. Thus, while the porosity reservoir 30 shown in FIG. 9 devotes a smaller percentage of its overall volume to static storage (approximately 60% static volume using the dimensions shown in FIG. 9, as opposed to the approximately 90% static volume shown in FIG. 4), the ability to maintain "dynamic" storage within the reservoir without the need for extra infrastructure beyond that required for mitigation makes up for the smaller amount of static storage.

Figure 10:
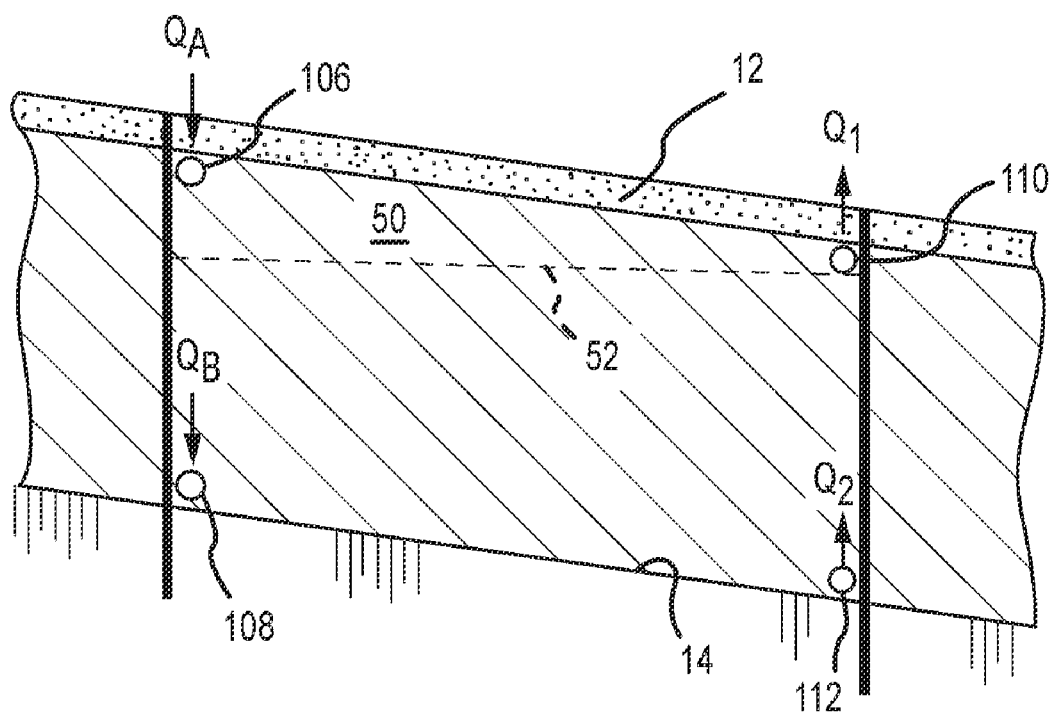
FIG. 10 is a section view illustrating alternatives comprising a plurality of water inflow points at the upstream portion of the porosity reservoir and/or a plurality of water outflow points at the downstream portion of the reservoir.

As noted above, the quality of water within the porosity reservoir 30 is further improved by passing external water through the reservoir (as opposed to simply recycling the water within the wedge 50). The stored water may be further filtered by providing multiple outflow and/or inflow points within the porosity reservoir 30 (regardless of whether the existing water is recirculated or external water is added to the reservoir). FIG. 10 illustrates a plurality of inflow points 106 and 108 at the upstream end of the porosity reservoir 30, as well as a plurality of outflow points 110 and 112 at the downstream end of the porosity reservoir. In this example, one of the inflow points 106 is contained with the wedge portion 50 of the reservoir, while a second inflow point 108 is positioned lower within the static portion of the reservoir 30 (e.g., just above the aquiclude 14). Similarly, one of the outflow points 110 is positioned at the downstream limit of the wedge portion 50, while a second outflow point 112 is positioned within the static portion of the reservoir 30. Each inflow and outflow point includes a corresponding flow rate (i.e., $Q_A$ and $Q_B$ for the inflow points 106 and 108, respectively, and $Q_1$ and $Q_2$ for the outflow points 110 and 112, respectively), wherein dynamic storage capacity within the reservoir 30 is maintained by ensuring that the sum of the inflow rates is substantially the same as the sum of the outflow rates (i.e., wherein $(Q_A+Q_B)=(Q_1+Q_2)$). As described above, these combined flow rates will equal $Q_{FULL}$ when a maximum storage capacity is achieved within the porosity reservoir 30 (i.e., when the wedge portion 50 is full).

Utilizing multiple inflow points (106, 108) and/or multiple outflow points (110, 112) enhances circulation or mixing of the water throughout the entire reservoir 30. For example, withdrawing water from the bottom outflow point 112 allows the stored water to mix downward through the alluvial material of the reservoir 30, thereby enhancing the natural filtration of the water. Even where the water is only recirculated within the reservoir (as in FIG. 5), the water withdrawn from the lower outflow point 112 may be pumped back to the upper inflow point 106, while the water withdrawn from the upper outflow point 110 may be pumped back to the lower inflow point 108 in order to promote mixing and circulation within the reservoir. Similarly, if external water is applied to the two inflow points 106 and 108, the respective flow rates $Q_A$ and $Q_B$ may be adjusted to promote mixing within the reservoir before the water is removed through one or more outflow points. In one embodiment, the flow rate $Q_A$ may be set to zero so that the wedge portion 50 is filled from the bottom up.

Thus, embodiments of the present invention may utilize multiple inflow and/or outflow points as shown in FIG. 10 with either a recirculation system (as shown in FIGS. 5 and 6) or an external water recharge system (as shown in FIGS. 7 and 8). Additionally, while only two separate inflow points (106 and 108) and two separate outflow points (110 and 112) are shown, it is understood that three or more such points may be utilized to further promote the mixture of the water within the reservoir 30. Further, although the separate inflow and outflow points in FIG. 10 are shown to be vertically separated, alternative embodiments may employ lateral separation as well (i.e., separating by position as well as depth) in order to account for variations of depth within the aquiclude 14. For example, an additional outflow point may be positioned within the depressed portion of the reservoir shown in FIG. 3 in order to circulate the otherwise trapped volume of water 42.

Figure 11:
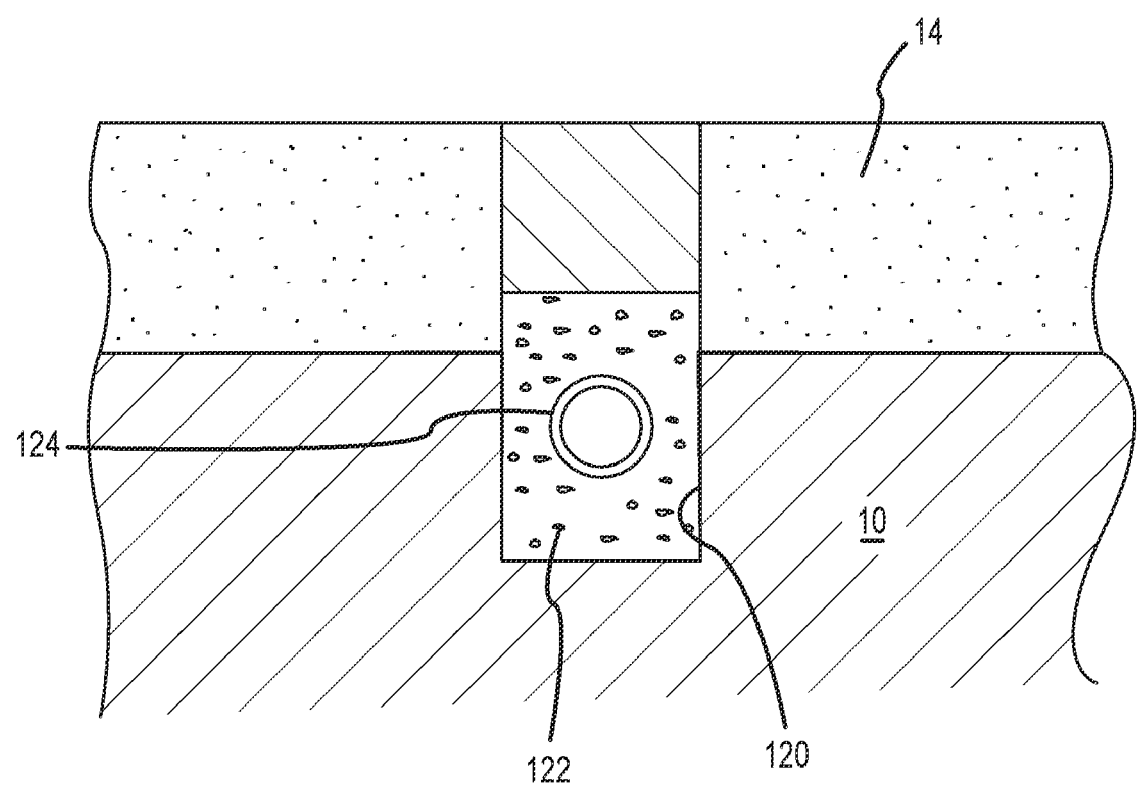
FIG. 11 is a section view illustrating the details of a French drain system shown in FIG. 6.

FIG. 11 illustrates a section view of a preferred French drain system for collecting and/or distributing the water within the reservoir 30 (e.g., a section view of the French drain lines 64 or 72 shown in FIG. 6). In one embodiment, a trench 120 is excavated within the alluvial material 10, and porous material 122 (such as a gravel bedding) is placed within the bottom of the trench 120. A perforated pipe 124 (preferably wrapped with an appropriate geo-textile fabric) is then placed atop the porous material so that the depth of the pipe is below the topsoil-alluvial interface. The remainder of the trench 120 is then filled with additional amounts of the porous material 122 to maximize the flow rate to and from the perforated pipe 124 (i.e., reduce resistance to water flow) and minimize the potential for clogging the pipe perforations. While a particular depth of the perforated pipe 124 is shown in FIG. 11, one skilled in the art will understand that the depth may be varied up or down, provided that the pipe 124 continues to communicate with the pore spaces of the alluvial material. Furthermore, as described above, alternative means for collecting and distributing water at both the downstream and upstream ends of the porosity reservoir 30 may be utilized in place of the French drain system shown in FIG. 11.

Each of the dynamic storage methods described above represents an increase in cost and/or complexity of operating an underground porosity storage reservoir. Thus, the additional costs must be evaluated by each reservoir operator to determine whether the increased storage capacity offsets the higher costs. Provided that the analysis is undertaken at the design phase of the reservoir, it is believed that the additional costs may be justified (particularly in the case of a passive system) in light of the potential capacity increase (e.g., up to ten percent using the example of FIG. 4, and closer to forty percent using the example of FIG. 9). Additionally, the increase in capacity may be even larger for those cases where the grade of the land containing the porosity reservoir is greater than normal (e.g., greater than approximately 0.2%), or where the overall length of the reservoir is greater (as described above with respect to FIG. 9). On the other hand, water can only be dynamically stored within the wedge 50 when the static portion of the porosity reservoir 30 is completely filled and additional water is available for dynamic storage. During such periods when additional water is not available for dynamic storage (e.g., during a drought), the methods of the present invention may be dormant (e.g., $Q_{OUT}$ and $Q_{IN}$ are zero so that water is not recirculated as shown in FIGS. 5 and 6; water is not pumped from the alluvial well in FIG. 7; and the valve 104 is closed in the passive system shown in FIG. 8 to prevent filling the reservoir 30 when the water level is below the static level denoted by line 52).

It will be clear that the present invention is well adapted to attain the ends and advantages mentioned as well as those inherent therein. While presently preferred embodiments have been described for purposes of this disclosure, various changes and modifications may be made which are well within the scope of the present invention. Thus, the various embodiments described above are provided by way of illustration only and should not be construed to limit the invention. Those skilled in the art will readily recognize various modifications and changes that may be made to the present invention without departing from the true spirit and scope of the present invention, which is set forth in the following claims.

What is claimed is:

1. A method for dynamically storing water in an underground porosity reservoir, wherein the reservoir includes an upstream end and a downstream end, the method comprising:
    filling the reservoir with water so that a water level of the reservoir fills a static portion of the reservoir and extends into an elevated wedge portion of the reservoir, wherein the static portion extends below an elevation of the downstream end of the reservoir, and the wedge portion extends above the static portion of the reservoir;
    removing water from the downstream end of the reservoir at a first flow rate $Q_{OUT}$; and
    adding water to the upstream end of the reservoir at a second flow rate $Q_{IN}$, wherein the flow rates $Q_{OUT}$ and $Q_{IN}$ are substantially equal in order to maintain the water stored within the wedge portion of the reservoir.

2. The method according to claim 1, wherein the steps of removing water from the downstream end of the reservoir and adding water to the upstream end of the reservoir further comprise:
    collecting water within a first system positioned at the downstream end of the reservoir;
    pumping the collected water to the upstream end of the reservoir; and
    distributing the collected water through a second system at the upstream end of the reservoir.

3. The method according to claim 2, wherein both the first and second systems include at least one perforated pipe for respectively collecting and distributing water.

4. The method according to claim 2, wherein both the first and second systems are positioned within the wedge portion of the reservoir.

5. The method according to claim 2, wherein at least one of the first and second systems are positioned below the wedge portion of the reservoir to promote mixing of the water within the reservoir.

6. The method according to claim 1, wherein the step of removing water from the downstream end of the reservoir further comprises:
    collecting water within a first system positioned at the downstream end of the reservoir; and
    releasing the collected water at a point outside of the boundary of the reservoir at the flow rate $Q_{OUT}$.

7. The method according to claim 6, wherein the step of adding water to the upstream end of the reservoir further comprises:
    pumping water from outside of a boundary of the reservoir; and
    distributing the pumped water through a second system at the upstream end of the reservoir at the flow rate $Q_{IN}$.

8. The method according to claim 7, wherein the water is pumped from an alluvial well.

9. The method according to claim 6 wherein the step of adding water to the upstream end of the reservoir further comprises:
    collecting external water at a point upstream of the reservoir;
    allowing the collected external water to drain by gravity to the upstream end of the reservoir; and
    distributing the collected external water through a second system positioned within the wedge portion of the reservoir at the flow rate $Q_{IN}$.

10. The method according to claim 9, wherein the step of collecting external water at a point upstream of the reservoir includes intercepting alluvial groundwater.

11. The method according to claim 9, wherein the step of collecting external water at a point upstream of the reservoir includes diverting alluvial water from a reservoir mitigation system.

12. The method according to claim 1 wherein $Q_{IN}$ and $Q_{OUT}$ are equal to zero when the water level within the reservoir drops below a static level so that water is no longer stored within the wedge portion of the reservoir.

13. The method according to claim 1, wherein the step of removing water from the downstream end of the reservoir further comprises removing water from a plurality of collection points positioned separately within the reservoir, and wherein a combined flow rate of the water removed from each collection point equals the first flow rate $Q_{OUT}$.

14. The method according to claim 1, wherein the step of adding water to the upstream end of the reservoir further comprises adding water at a plurality of distribution points positioned separately within the reservoir, and wherein a combined flow rate of the water added at each distribution point equals the second flow rate $Q_{IN}$.

15. An underground porosity reservoir for storing water in alluvial deposits, the reservoir formed by one or more substantially water-impermeable barriers and an aquiclude, wherein the reservoir defines an upstream end and a downstream end, the reservoir comprising:
   a static portion extending below an elevation of the downstream end of the reservoir;
   an elevated wedge portion extending above the static portion of the reservoir;
   means for removing water from the downstream end of the reservoir at a first flow rate $Q_{OUT}$; and
   means for adding water to the upstream end of the reservoir at a second flow rate $Q_{IN}$, wherein the flow rates $Q_{OUT}$ and $Q_{IN}$ are substantially equal in order to maintain water stored within the wedge portion of the reservoir.

16. The porosity reservoir of claim 15, wherein the means for removing water from the downstream end of the reservoir and adding water to the upstream end of the reservoir further comprise:
   a first system positioned at the downstream end of the reservoir for collecting water;
   a pump for transferring the collected water to the upstream end of the reservoir; and
   a second system at the upstream end of the reservoir for distributing the collected water.

17. The porosity reservoir of claim 16, wherein both the first and second systems include at least one perforated pipe for respectively collecting and distributing water.

18. The porosity reservoir of claim 16, wherein both the first and second systems are positioned within the wedge portion of the reservoir.

19. The porosity reservoir of claim 16, wherein at least one of the first and second systems are positioned below the wedge portion of the reservoir to promote mixing of the water within the reservoir.

20. The porosity reservoir of claim 15, wherein the means for removing water from the downstream end of the reservoir further comprises:
   a first system for collecting water at the downstream end of the reservoir and releasing the collected water at a point outside of the boundary of the reservoir; and
   a flow meter connected to the first system to measure the flow rate $Q_{OUT}$ of the water released outside of the reservoir.

21. The porosity reservoir of claim 20, wherein the means for adding water to the upstream end of the reservoir further comprises:
   a pump to transfer water from outside of a boundary of the reservoir;
   a valve for setting the flow rate $Q_{IN}$ of water provided by the pump;
   a flow meter controlling the valve so that the flow rate $Q_{IN}$ is substantially equal to the flow rate $Q_{OUT}$; and
   a second system positioned at the upstream end of the reservoir to distribute the transferred water to the reservoir.

22. The porosity reservoir of claim 20 wherein the means for adding water to the upstream end of the reservoir further comprises:
   means for collecting external water at a point upstream of the reservoir;
   a conduit connected between the collection means and the upstream end of the reservoir to allow the collected external water to drain by gravity to the wedge portion of the reservoir;
   a valve connected to the conduit for setting the flow rate $Q_{IN}$ of water provided to the wedge portion of the reservoir;
   a flow meter controlling the valve so that the flow rate $Q_{IN}$ is substantially equal to the flow rate $Q_{OUT}$; and
   a second system positioned at the upstream end of the reservoir to distribute the collected external water within the wedge portion of the reservoir.

23. The porosity reservoir of claim 15, wherein $Q_{IN}$ and $Q_{OUT}$ are equal to zero when the water level within the reservoir drops below a static level so that water is no longer stored within the wedge portion of the reservoir.

24. The porosity reservoir of claim 15, wherein the means for removing water from the downstream end of the reservoir further comprise a plurality of collection points positioned separately within the reservoir, and wherein a combined flow rate of the water removed from each collection point equals the first flow rate.

25. The porosity reservoir of claim 15, wherein the means for adding water to the upstream end of the reservoir further comprises a plurality of distribution points positioned separately within the reservoir, wherein a combined flow rate of the water added at each distribution point equals the second flow rate.

* * * * *